US012773894B2

(12) United States Patent
Moore

(10) Patent No.: US 12,773,894 B2
(45) Date of Patent: Oct. 27, 2026

(54) SYSTEMS AND DEVICES FOR REMOVING, INSTALLING, AND STORING REMOVABLE COMPONENTS FROM CONVERTIBLE VEHICLES

(71) Applicant: Kevin Moore, Santa Paula, CA (US)

(72) Inventor: Kevin Moore, Santa Paula, CA (US)

(73) Assignee: Kevin Moore, Santa Paula, CA (US)

( * ) Notice: Subject to any disclaimer, the term of this patent is extended or adjusted under 35 U.S.C. 154(b) by 427 days.

(21) Appl. No.: 18/377,498

(22) Filed: Oct. 6, 2023

(65) Prior Publication Data

US 2025/0115106 A1 Apr. 10, 2025

(51) Int. Cl.

| | |
|---|---|
| ***B66C 23/48*** | (2006.01) |
| ***B25H 1/00*** | (2006.01) |
| ***B60J 7/10*** | (2006.01) |
| ***B60J 7/16*** | (2006.01) |
| ***B62D 65/02*** | (2006.01) |
| *B66C 23/44* | (2006.01) |
| *B66F 11/00* | (2006.01) |
| *B66F 19/00* | (2006.01) |

(52) U.S. Cl.

CPC .......... *B60J 7/1607* (2013.01); *B25H 1/0007* (2013.01); *B60J 7/106* (2013.01); *B62D 65/022* (2013.01); *B66C 23/48* (2013.01); *B66C 23/44* (2013.01); *B66C 23/485* (2013.01); *B66F 11/00* (2013.01); *B66F 19/00* (2013.01)

(58) Field of Classification Search

CPC ..... B66C 23/48; B66C 23/485; B25H 1/0007; B60J 7/106; B62D 65/022; B66F 11/00; B66F 19/00; B05B 13/0285

USPC ........................................................... 269/17

See application file for complete search history.

(56) References Cited

U.S. PATENT DOCUMENTS

| | | | | |
|---|---|---|---|---|
| 5,328,192 | A * | 7/1994 | Thompson | B62B 19/04 280/43.1 |
| 7,448,606 | B1 * | 11/2008 | Johnson | B05B 13/0285 269/16 |
| 8,770,561 | B2 * | 7/2014 | Gagnon, Jr. | B25B 11/00 118/500 |
| 9,643,823 | B2 | 5/2017 | Hall | |
| 9,932,209 | B2 * | 4/2018 | Smith | B66C 23/48 |
| 10,035,408 | B2 | 7/2018 | Crismon | |

(Continued)

*Primary Examiner* — Mahdi H Nejad

(74) *Attorney, Agent, or Firm* — Ferguson Case Orr Paterson LLP

(57) ABSTRACT

One embodiment of a modular device for removal, storage, and installation of removable components of a convertible vehicle according to the present disclosure comprises a wheeled base, a vertical support structure, and a horizontal support component, and a connector plate. The vertical support structure may attach to the wheeled base in a "stored" or "deployed" position. Similarly, the horizontal support component may attach to the wheeled base in a "stored" position or to the vertical support structure in a "deployed" position. Another embodiment of a modular device further comprises a plurality of support rods and storage rods. The support and storage rods may attach to the wheeled base in a "stored" or "deployed" position. One embodiment of a system according to the present disclosure comprises a device for removing, storing, and installing removable components from convertible automobiles that is configured to connect to a mechanical lifting device.

18 Claims, 22 Drawing Sheets

(56) References Cited

U.S. PATENT DOCUMENTS

| | | | | |
|---|---|---|---|---|
| 11,332,208 | B2 | 5/2022 | Hall | |
| 12,054,374 | B1 * | 8/2024 | Dongmei | B66F 7/02 |
| 12,448,258 | B1 * | 10/2025 | Cullinan | B25H 1/0007 |
| 2010/0192271 | A1 * | 8/2010 | Mackiewicz | A47G 9/066<br>2/69 |
| 2016/0257535 | A1 * | 9/2016 | Hall | B66C 23/48 |
| 2017/0121156 | A1 * | 5/2017 | Smith | B66C 23/48 |
| 2020/0094863 | A1 * | 3/2020 | Parrish | B60D 1/52 |
| 2020/0131008 | A1 * | 4/2020 | Hall | F16M 11/26 |
| 2022/0111918 | A1 * | 4/2022 | Hall | B62D 65/022 |
| 2023/0257042 | A1 * | 8/2023 | Hall | B62D 65/022<br>414/815 |

* cited by examiner

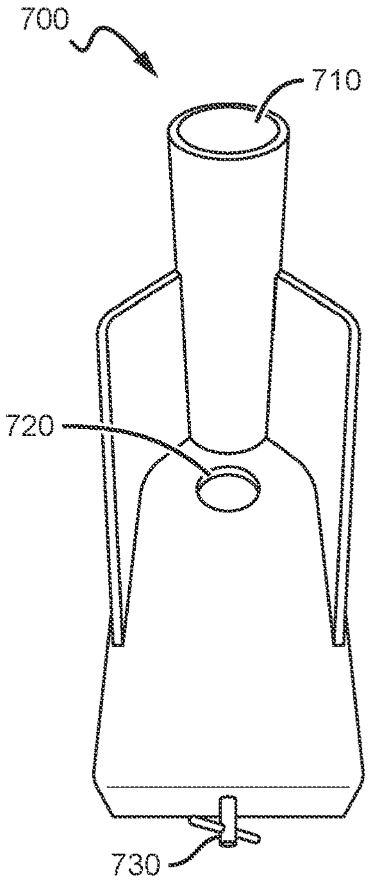
FIG. 9
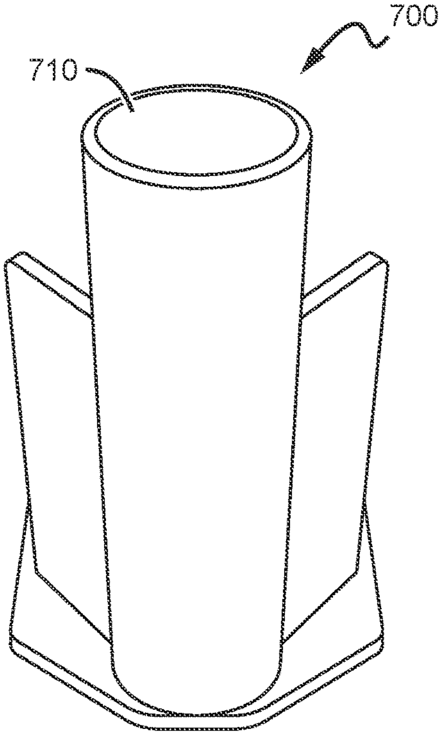
FIG. 10
FIG. 11
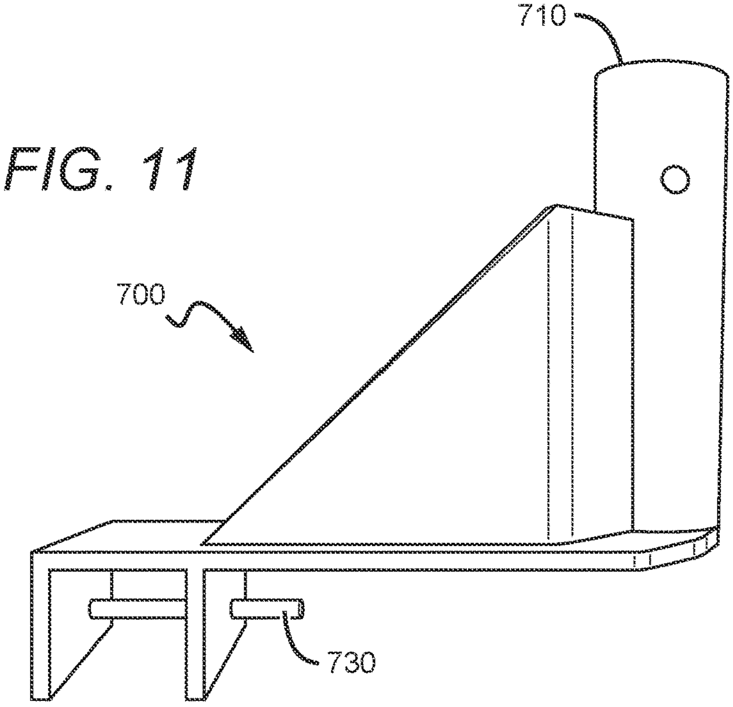

SYSTEMS AND DEVICES FOR REMOVING, INSTALLING, AND STORING REMOVABLE COMPONENTS FROM CONVERTIBLE VEHICLES

BACKGROUND

Field of the Disclosure

The present disclosure relates to portable systems and devices directed at the removal, modular storage, and installation of the tops and doors of convertible vehicles.

Description of the Related Art

Some vehicles are configured with a soft or hard convertible roof. These convertible roofs may be partially or completely removable. Many of these removable roof tops, especially the hardtops, are heavy and bulky making it difficult for one person to handle removal and/or installation.

There are systems and devices that can assist with removing and installing convertible SUV tops and doors. The systems and devices typically utilize overhead lifts. These overhead lifts may be installed in an owner's garage. When utilizing these types of overhead lifts, the owners will drive and position their vehicle below the device. Once positioned, the owner then connects the hardtop to the lift, release the hardtop from the vehicle, lift the hardtop from the vehicle, then drive the vehicle away from the lift and the detached hardtop. Installing (or re-installing) the hardtop is done in a similar, but reverse, manner.

While these types of lift systems are effective in removing and installing hardtops, they also present certain logistical issues. For example, this type of system requires a garage or other support structure available onto which the system can be installed or attached. Moreover, these types of systems are not portable.

There are also free-standing systems and devices that can assist with removing and installing convertible SUV tops and doors. The free-standing systems and devices available are still very bulky and not easily portable. They also do not assist with the efficient, simple storage of the hardtop and removable doors.

SUMMARY OF THE DISCLOSURE

One embodiment of a modular device for removal, storage, and installation of removable components of a convertible vehicle according to the present disclosure comprises a wheeled base, a vertical support structure configured to removably attach to the wheeled base in a plurality of positions, and a horizontal support component configured to removably attach to the vertical support structure and the wheeled base, and a connector plate. The vertical support structure may attach to the wheeled base in a "stored" position or in a "deployed" or "in-use" position. Similarly, the horizontal support component may attach to the wheeled base in a "stored" position or to the vertical support structure in a "deployed" or "in-use" position.

Another embodiment of a modular device for removal, storage, and installation of removable components of a convertible vehicle according to the present disclosure further comprises a plurality of support rods configured to removably attach to the wheeled base in a plurality of positions. Like the vertical support structure, the support rods may attach to the wheeled base in a "stored" position or in a "deployed" or "in-use" position.

Yet another embodiment of a modular device for removal, storage, and installation of removable components of a convertible vehicle according to the present disclosure further comprises a plurality of storage rods configured to removably attach to the wheeled base in a plurality of positions. Like the vertical support structure and the support rods, the storage rods may attach to the wheeled base in a "stored" position or in a "deployed"/"in-use" position.

One embodiment of a system for removing, storing, and installing removable components from convertible automobiles according to the present disclosure comprises a device for removing, storing, and installing removable components from convertible automobiles that is configured to connect to a mechanical lifting device.

These and other further features and advantages of the disclosure would be apparent to those skilled in the art from the following detailed description of the disclosure and accompanying drawings which set forth illustrative embodiments in which the principles of the disclosures are utilized.

BRIEF DESCRIPTION OF THE DRAWINGS

FIG. 9 is a top, front perspective view of a connector plate of a modular device for removing, storing, and installing removable components from convertible automobiles according to one embodiment of the present disclosure;

FIG. 10 is a top, back perspective view of the connector plate according to the embodiment of the present disclosure as shown in FIG. 9;

FIG. 11 is a right side view of the connector plate according to the embodiment of the present disclosure as shown in FIG. 9;

Figure 1:
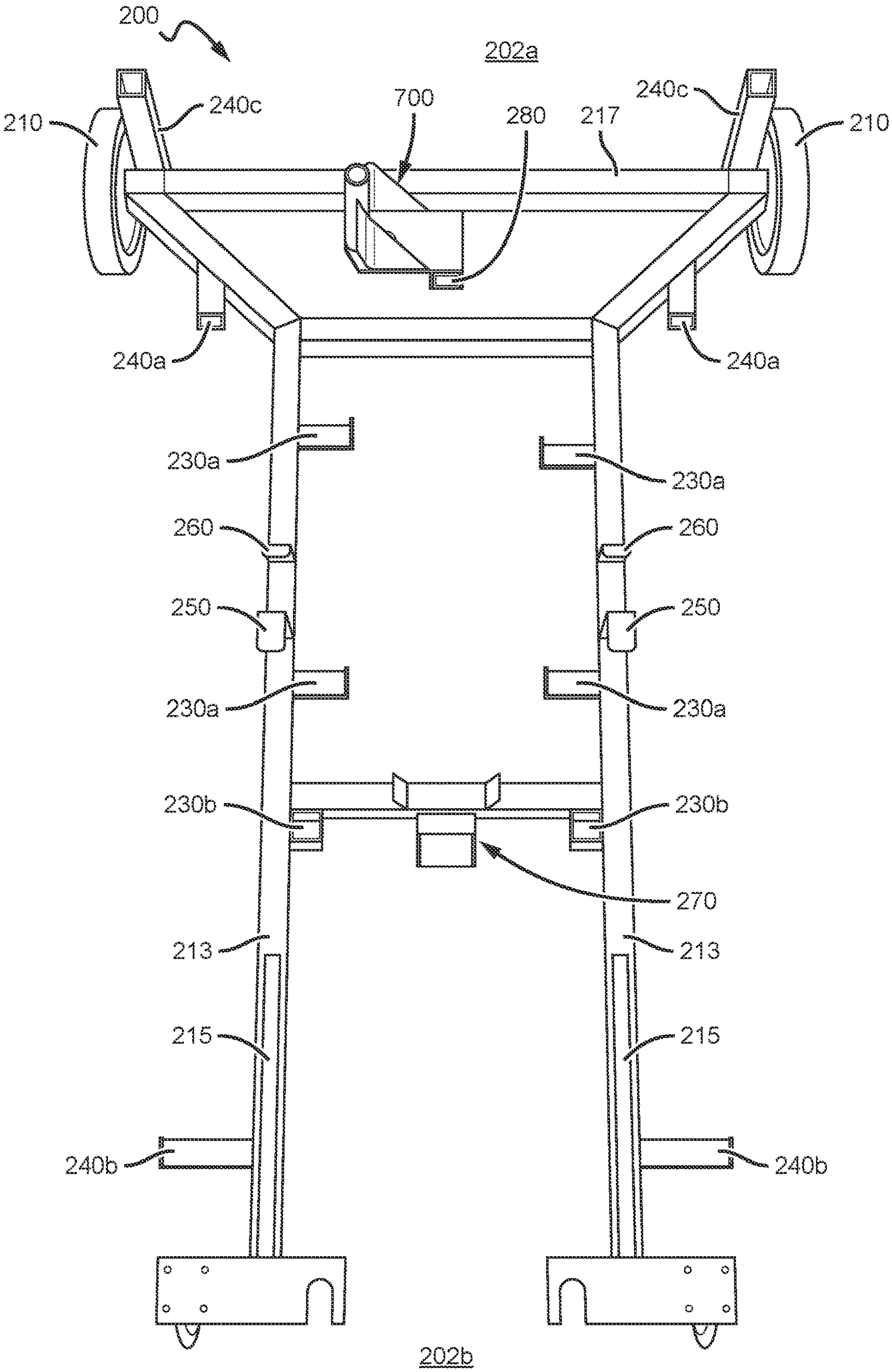
FIG. 1 is a top view of a wheeled base of a modular device for removing, storing, and installing removable components from convertible automobiles according to one embodiment of the present disclosure.

The drawings are for the purpose of illustrating various exemplary embodiments. It is understood that the disclosure is not limited to the arrangements and depictions shown in the drawings.

DETAILED DESCRIPTION OF THE DISCLOSURE

Embodiments incorporating features of the present disclosure include modular systems and devices directed to removing, storing, and installing removable tops and doors of convertible vehicles include a wheeled base, a vertical support structure, a horizontal support component, and a connector plate. The vertical support structure and horizontal support component both have a stored position and a deployed position. When in their stored positions, the modular device becomes compact, relatively flat, and easily storable. The device may also comprise a plurality of support and storage rods that have stored and deployed positions. These systems and devices may further comprise a mechanical lifting device. These systems and devices allow one person to be able to remove heavy and large hard tops from convertible vehicle and convenient storage of removable tops and doors.

Throughout this description, the embodiments and examples illustrated should be considered as exemplars, rather than as limitations on the present disclosure. As used herein, the term "disclosure," "device," "present disclosure," or "present device" refers to any one of the embodiments of the disclosure described herein, and any equivalents. Furthermore, reference to various feature(s) of the "disclosure," "device," "present disclosure," or "present device" throughout this document does not mean that all claimed embodiments or methods must include the referenced feature(s).

It is also understood that when an element or feature is referred to as being "on" or "adjacent" to another element or feature, it can be directly on or adjacent to the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to different views and illustrations that are schematic illustrations of idealized embodiments of the disclosure. As such, variations from the shapes of the illustrations as a result, for example, of manufacturing techniques and/or tolerances are expected. Embodiments of the disclosure should not be construed as limited to the particular shapes of the regions illustrated herein, but are to include deviations in shapes that result, for example, from manufacturing.

As shown in FIGS. 12-15 and 22-29, one embodiment of a modular device 100 directed to removing, storing, and installing removable components of convertible vehicles comprises (1) a wheeled base 200; (2) a vertical support structure 400; (3) a horizontal support component 300; and (4) a connector plate 700. Given its modularity, the embodiments of a modular device 100 has a plurality configurations but this disclosure will focus on a "deployed" configuration, a "stored" configuration, and a few "partially deployed" configurations. The various components of the modular device 100 have a plurality of positions on or throughout the modular device 100. This disclosure will focus on the components' "deployed" and "stored" positions. FIGS. 12-15 show the modular device 100 in its stored configuration. FIGS. 18-21 show the modular device 100 in a partially deployed configuration. FIGS. 22 and 24-29 show the device 100 in its fully deployed configuration.

FIG. 1 is one embodiment of a wheeled base 200 of a modular device 100 according to the present disclosure. The wheeled base 200 in FIG. 1 has a front end 202*a* and a back end 202*b* and comprises two wheels 210 at the front end 202*a* ("front wheels"), two wheels 220 at the back end 202*b* ("back wheels"). The front wheels 210 are connected to one another via at least one connection rod 217. Each back wheel 220 is also connected to one of the front wheels 210 via a connection rod 213. The connection rods 213, 217 form a frame of the wheeled base 200. The connection rods 213, 215 form a U-shape in the embodiment shown in FIG. 1. The connection rods in the FIG. 1 embodiment have a width of 1 and ⅞ inches, but it is understood that different diameters may be used, such as 1 inch, 1.5 inches, 2 inches, and so on. They are also square rods but it is understood that different shaped rods may be used.

The wheeled base 200 also comprises an adapter 270 configured to connect to a mechanical lifting device and a connector plate 700. In some embodiments, the wheeled base 200 may also comprise rubber strips 215, or other strips of other non-slip material.

Figure 2:
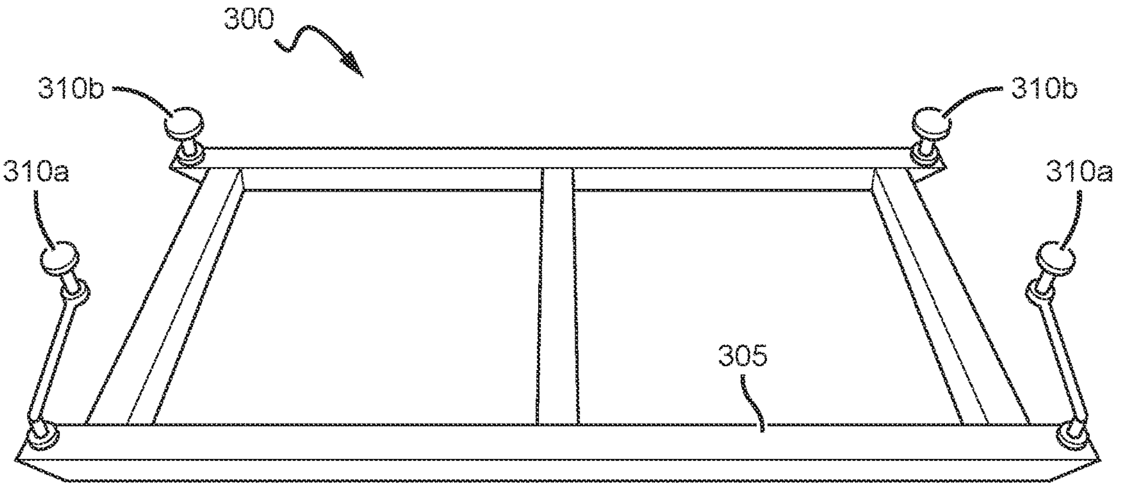
FIG. 2 is a top, front perspective view of a horizontal support component of a modular device for removing, storing, and installing removable components from convertible automobiles according to one embodiment of the present disclosure.

FIG. 2 is a top view of a horizontal support component 300 of one embodiment of a modular device 100 according to the present disclosure. The horizontal support component 300 comprises a body 305 and a plurality of support plates 310*a*, 310*b* attached to the edges of the body 305 of the horizontal support component 300. The embodiment shown in FIG. 2 has a rectangular body 305 and four support plates 310*a*, 310*b*, one at each corner of the rectangular body 305. However, it is understood that many different body shapes are possible, such as a circle or square. It is also understood that more or less support plates are possible, such as 2, 3, 5, 6, or more.

The body 305 in the FIG. 2 comprises 1.5 inch wide square rods, but it is understood that different widths may be used, such as 1 inch, 2 inches, and so on. They are also square rods but it is understood that different shaped rods may be used.

Two of the four support plates 310*a*, 310*b* in the horizontal support component 300 embodiment shown in FIG. 2 are adjustable 310*a* within their plane parallel to the horizontal support component 300 whereas the remaining two are stationary 310*b*. It is understood that more or less support plates can be adjustable and/or stationary.

The horizontal support component 300 is removably attachable to the wheeled base 200 and the vertical support structure 400. As shown in FIGS. 12-15 and 17-18, when attached to the wheeled base 200, the horizontal support component 300 is in its "stored" position. In the embodiment shown in FIG. 1, the wheeled base 200 has attachment mechanisms 260 for the horizontal support component 300 to be stored on the wheeled base 200. The wheeled base 200 comprises brackets 260 configured to allow the horizontal support component to 300 latch on to, but it is understood that other attachment mechanisms may be used such as pin-and-lock, fasteners, or hooks.

As best seen in FIGS. 19-21 and 24-25, when attached to the vertical support structure 400, the horizontal support component 300 is in its "deployed position." The horizontal support component 300 is placed in its deployed position when the vertical support component 400 is also in its deployed configuration, as discussed in detail below. In some embodiments, the horizontal support component 300 is configured with a hole or slot wherein one end of the vertical support component 400 may be inserted so as to removably connect the two. It is understood that these two pieces may be connected by other means.

Figure 3:
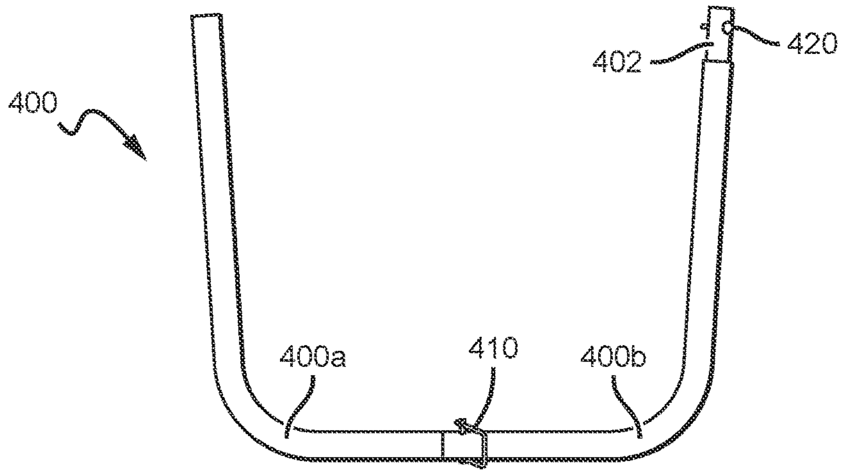
FIG. 3 is a top view of a vertical support structure in a "stored" configuration of a modular device for removing, storing, and installing removable components from convertible automobiles according to one embodiment of the present disclosure.

FIG. 3 is a top view of one embodiment of a vertical support structure 400 of a modular device 100 according to the present disclosure. The structure 400 comprises two pieces 400*a*, 400*b*. In the preferred embodiment shown in FIGS. 3 and 4, the two pieces are two L-shaped, cylindrical rods 400*a*, 400*b* that are configured to be connected and set in place through a pin lock 410. The cylindrical rods 400*a*, 400*b* have a diameter of 1.75 inches but it is understood that different diameters may be used. The vertical support structure 400 may also have a narrowed portion 402 at an exposed end of one of the cylindrical rods 400*b* with another pin lock 420.

The vertical support structure 400 can convert between two configurations. The first is its stored configuration 400 and the second is its deployed configuration 400'.

When in its stored configuration, the vertical support structure 400 is U-shaped. When the pin is taken out of the pin lock 410, the two pieces 400*a*, 400*b* are free to rotate relative to one another.

Figure 4:
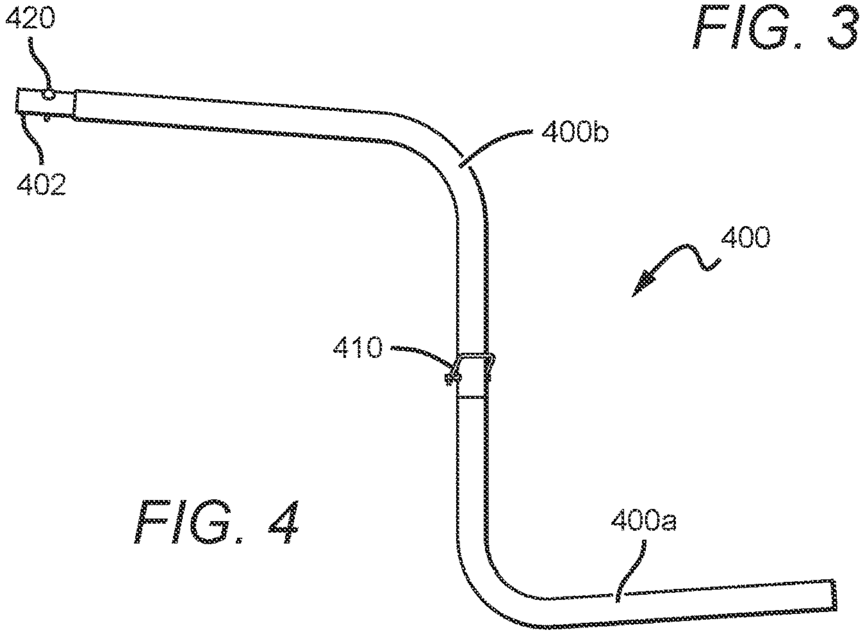
FIG. 4 is a top view of the vertical support structure according to the embodiment of the present disclosure as shown in FIG. 3 in a "deployed" configuration.

FIG. 4 shows the vertical support structure 400' in its deployed configuration. In the preferred embodiment the deployed configuration for the vertical support structure 400' is an S-shape configuration.

The vertical support structure 400 is removably attachable to the wheeled base 200 in at least two different locations on the wheeled base 200. When the vertical support structure 400 is in its stored configuration, it can be placed and stored on brackets 250 on the wheeled base 200. FIGS. 12-15 and 17 best shown the vertical support structure 400 in its stored configuration and in its stored position on the wheeled base 200.

Figure 22:
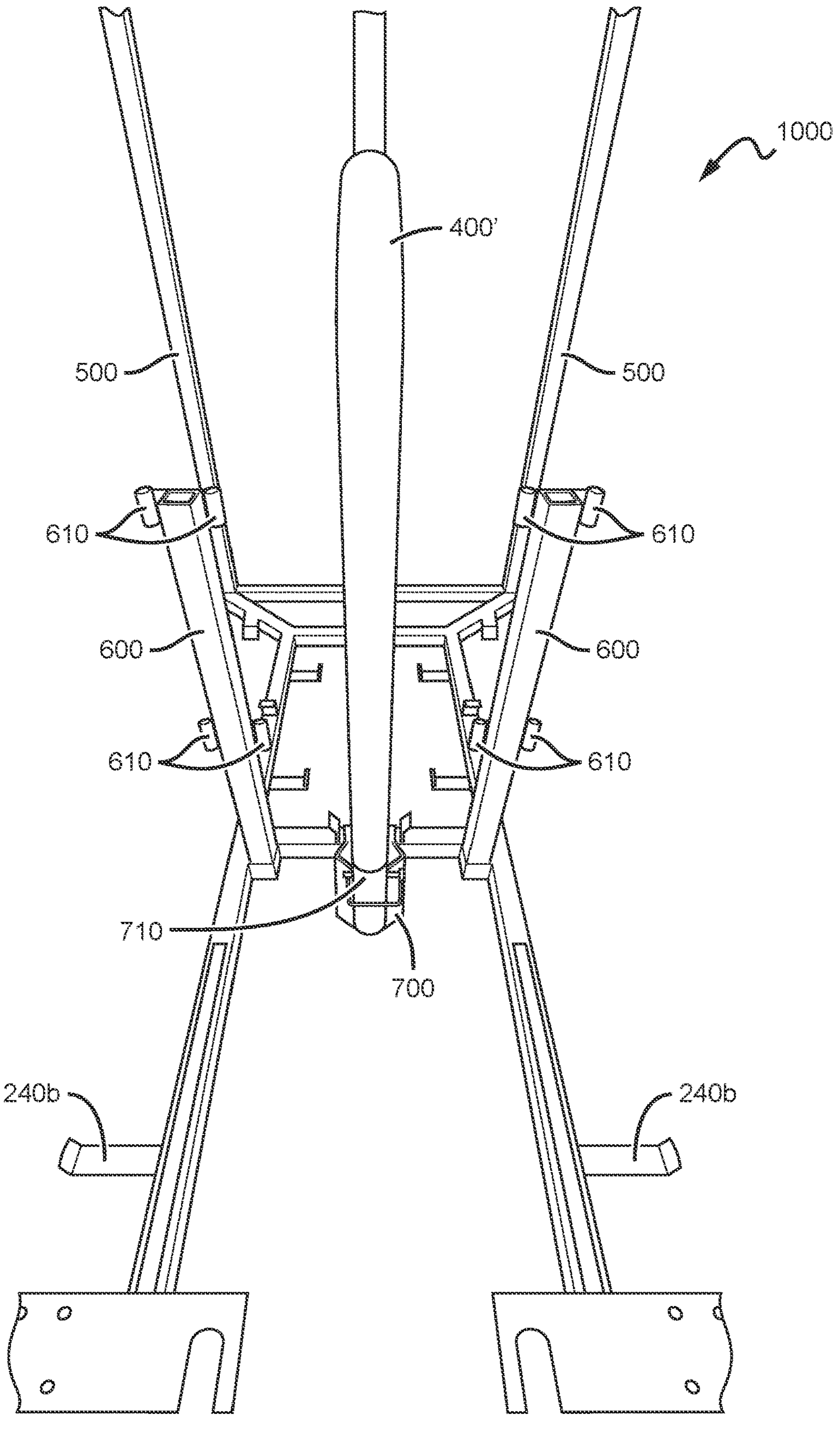
FIG. 22 is a top, back perspective view of the modular device for removing, storing, and installing removable components from convertible automobiles according to the embodiment of the present disclosure as shown in FIG. 12 with two storage rods in "deployed" positions.
Figure 23:
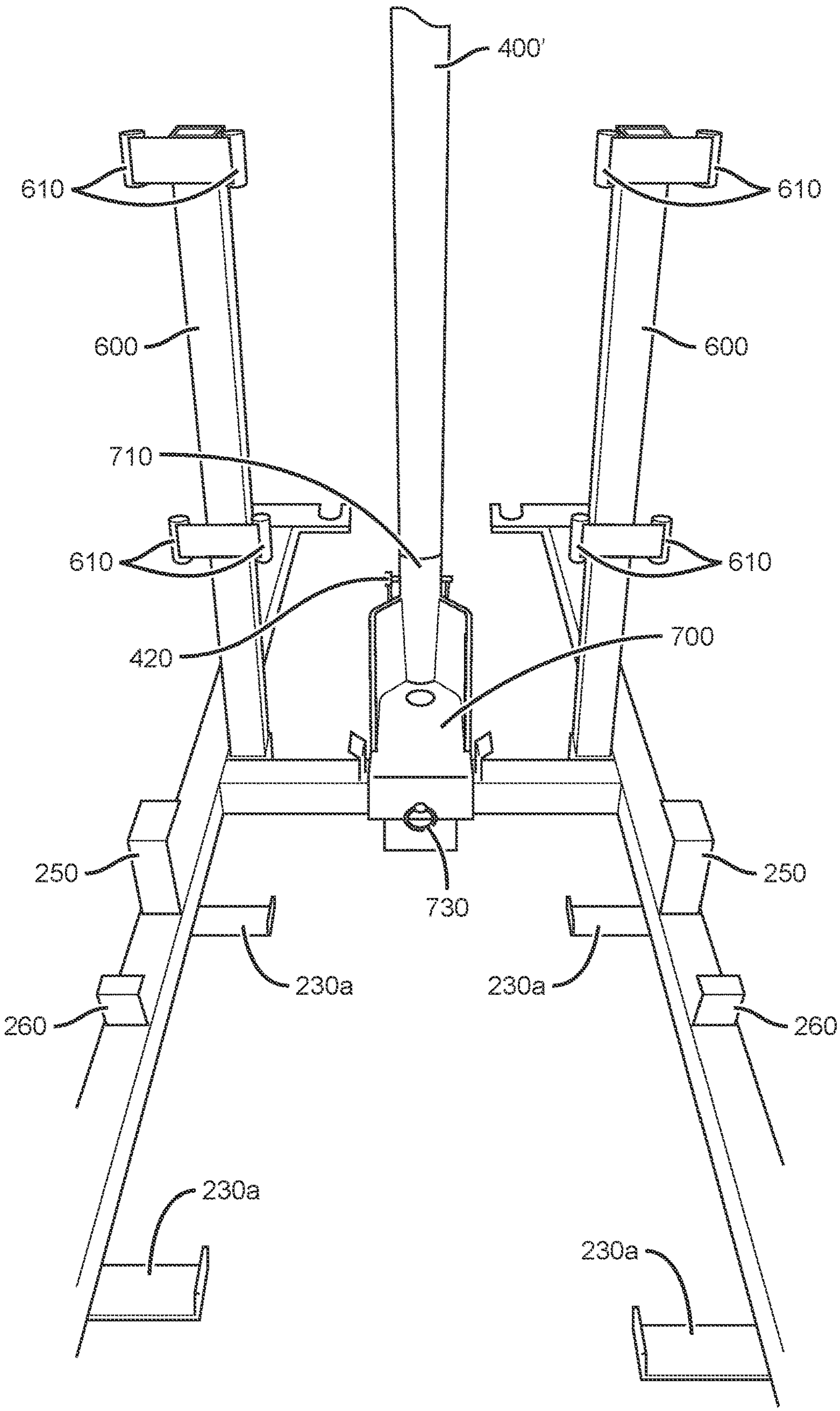
FIG. 23 is a top, front perspective view of the modular device for removing, storing, and installing removable components from convertible automobiles according to the embodiment of the present disclosure as shown in FIG. 12 with two storage rods in "deployed" positions.
Figure 24:
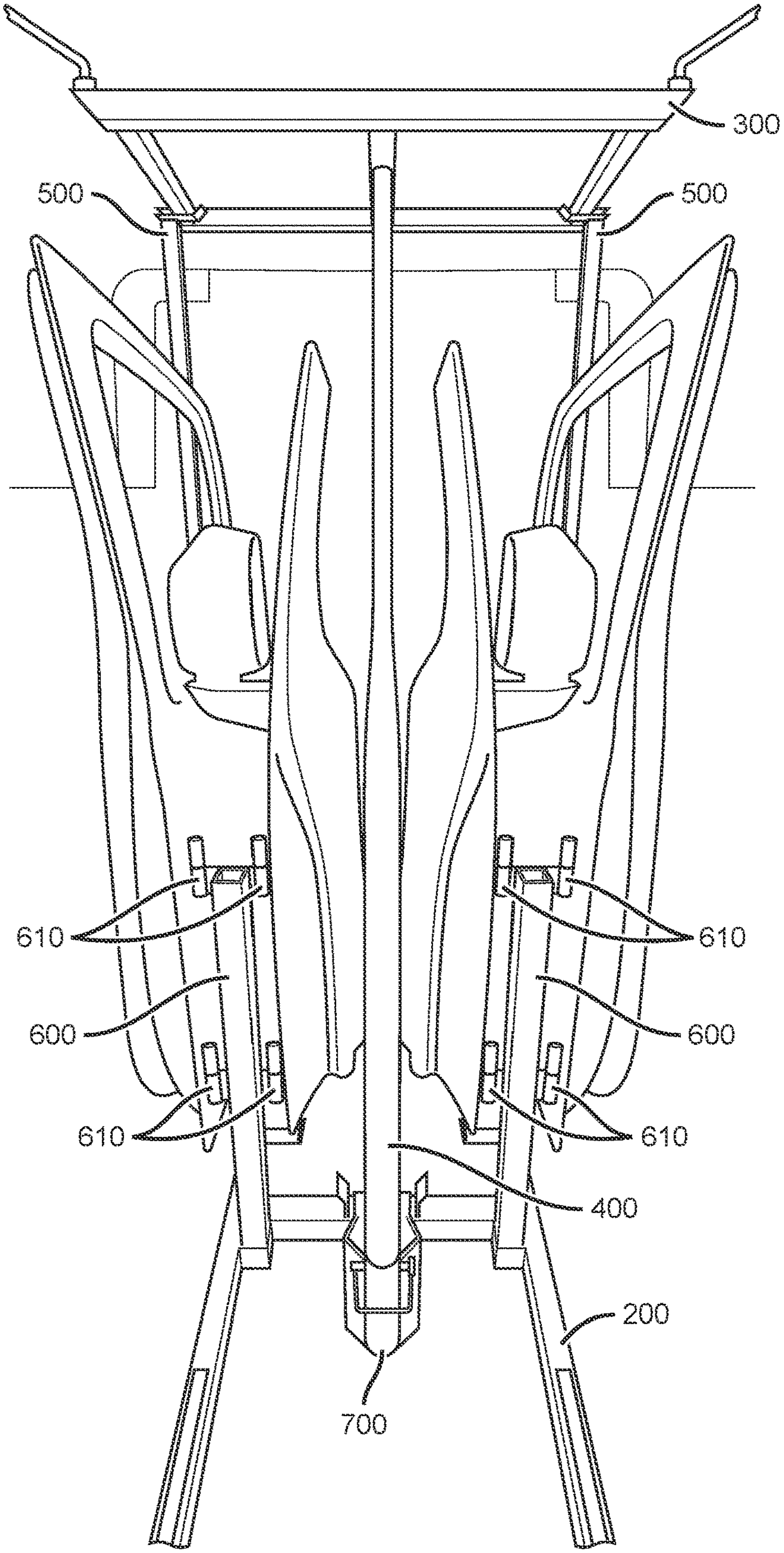
FIG. 24 is a front, close-up view of the modular device for removing, storing, installing removable components from convertible automobiles according to the embodiment of the present disclosure as shown in FIG. 12 with two storage rods in "deployed" positions and holding four removable doors from a convertible vehicle.

When the vertical support structure 400' is in its deployed configuration, it can be removably attached to the wheeled base 200 through the connector plate 700. This is best shown in FIGS. 22-24. In some embodiments of the modular device 100, the connector plate 700 has a "stored" position and "deployed" position on the wheeled base 200. The connector plate 700 may be stored on the wheeled base 200 via an attachment mechanism and many types attachment mechanisms are possible. For example, the attachment mechanisms may be a fastener, pin lock, hook-and-loop system, or brackets on the wheeled base 200. The embodiment shown in FIG. 1 shows one example of an attachment mechanism 280 for the connector plate 700. When the connector plate 700 is connected to the attachment mechanism 280, it is in its stored position. The connector plate's 700 deployed position and the interaction between the connector plate 700, the wheeled base 200, and the vertical support structure 400' is discussed in detail below.

Figure 5:
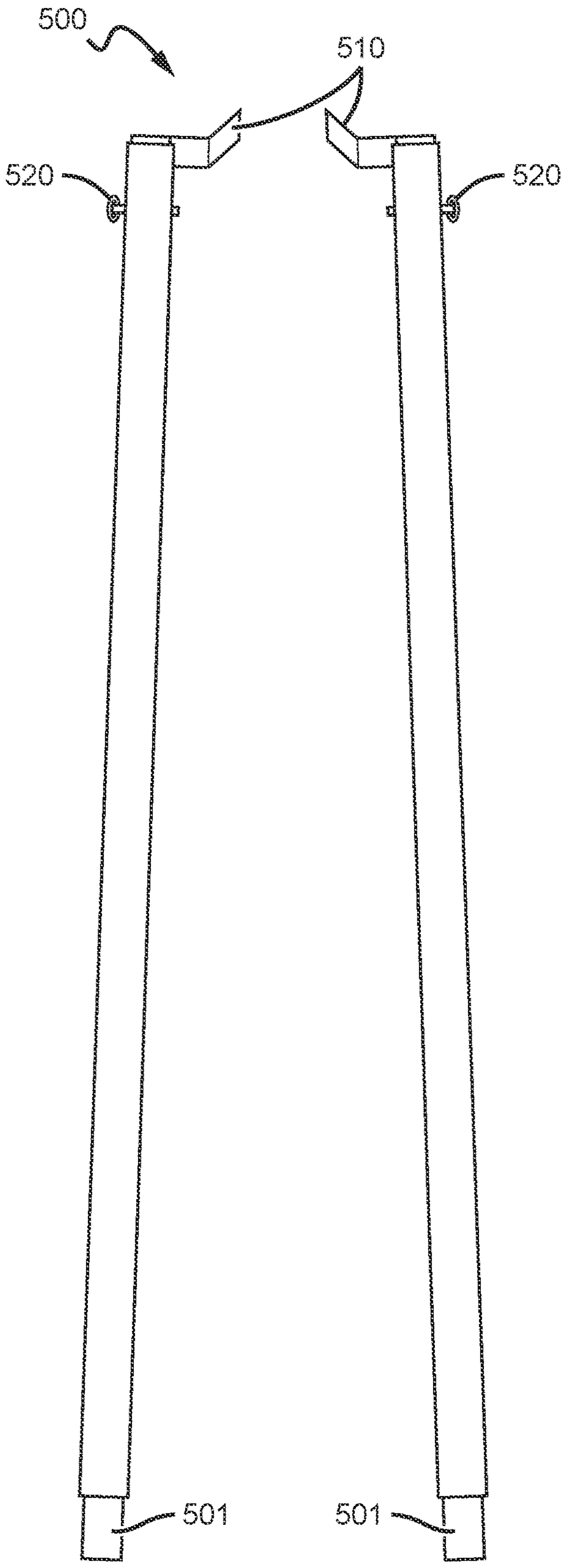
FIG. 5 is a front view of two support rods of a modular device for removing, storing, and installing removable components from convertible automobiles according to one embodiment of the present disclosure.
Figure 6:
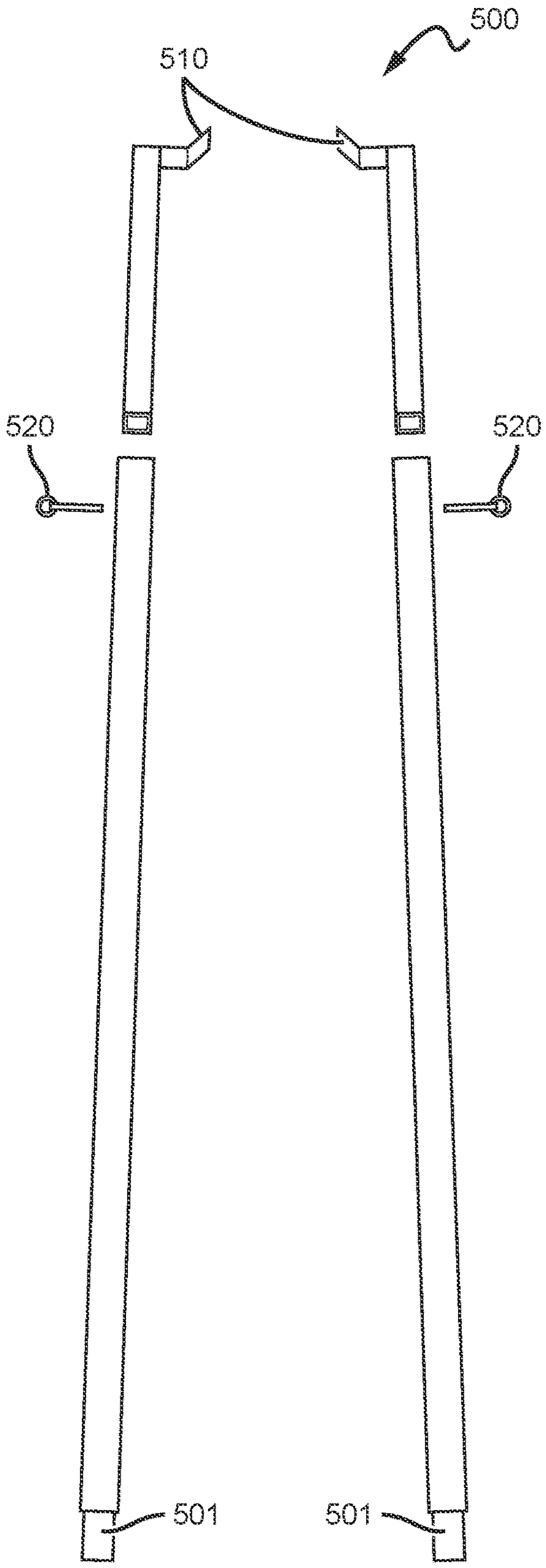
FIG. 6 is an exploded front view of the two support rods according to the embodiment of the present disclosure as shown in FIG. 5.

In some embodiments, the modular device 100 further comprises a plurality of support rods 500 that are removably attachable to the wheeled base 200 in a "deployed" position and a "stored" position. The support rods 500 in the embodiment shown in FIGS. 5 and 6 are square rods and have a width of 1 and ¼ inches, but it is understood that different diameters may be used, such as 1 inch, 1.5 inches, 2 inches, and so on. They are also square rods but it is understood that different shaped rods may be used.

In the embodiment shown in FIG. 1, the wheeled base 200 is configured with brackets 240*b* and sleeves 240*a* for the support rods 500 to attach to in their "stored" position. It is understood that other attachment mechanisms are possible, such as hook and loop systems, fasteners, pin and lock systems, and hooks. FIGS. 12-15 and 17-18 best show the support rods 500 in their stored position. The stored support rods 500 are co-planar and level with the wheeled base 200.

In their deployed position, the support rods 500 assist the horizontal support component 300 with holding up and storing a removable vehicle top. As shown in FIGS. 5 and 6, the support rods 300 may comprise extension pieces 510 configured to be inserted into one end of the support rods 300 and are adjustable to extend the height of the support rods 300. The extension pieces 510 may be set at different points using a lock-and-release mechanism, such as a pin lock.

Figure 20:
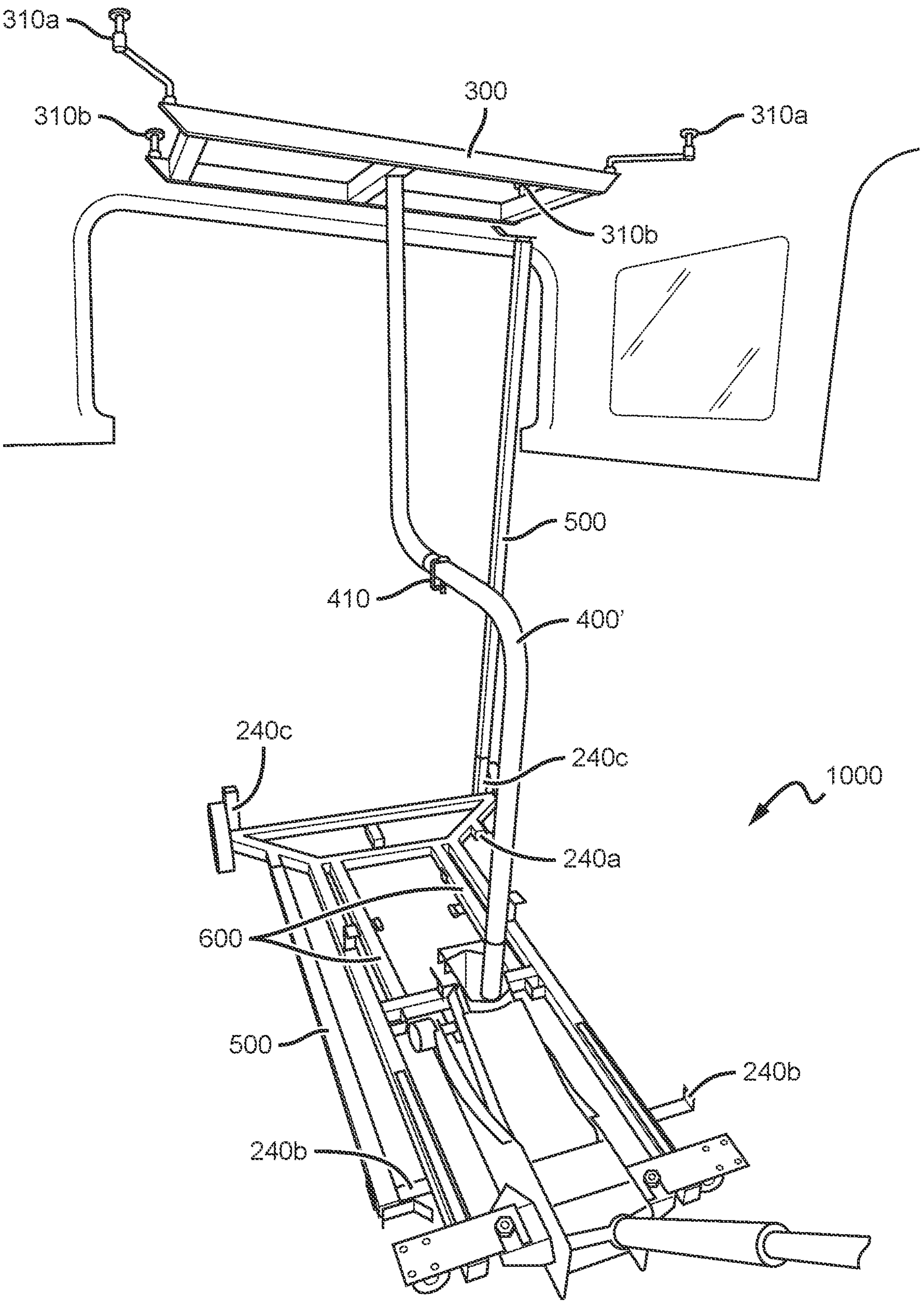
FIG. 20 is a top, back, right-side perspective view of the modular system for removing, storing, and installing removable components from convertible automobiles according to the embodiment of the present disclosure as shown in FIG. 17 with the vertical support structure, horizontal support component, and a support rod in "deployed" positions and supporting a removed hardtop.
Figure 21:
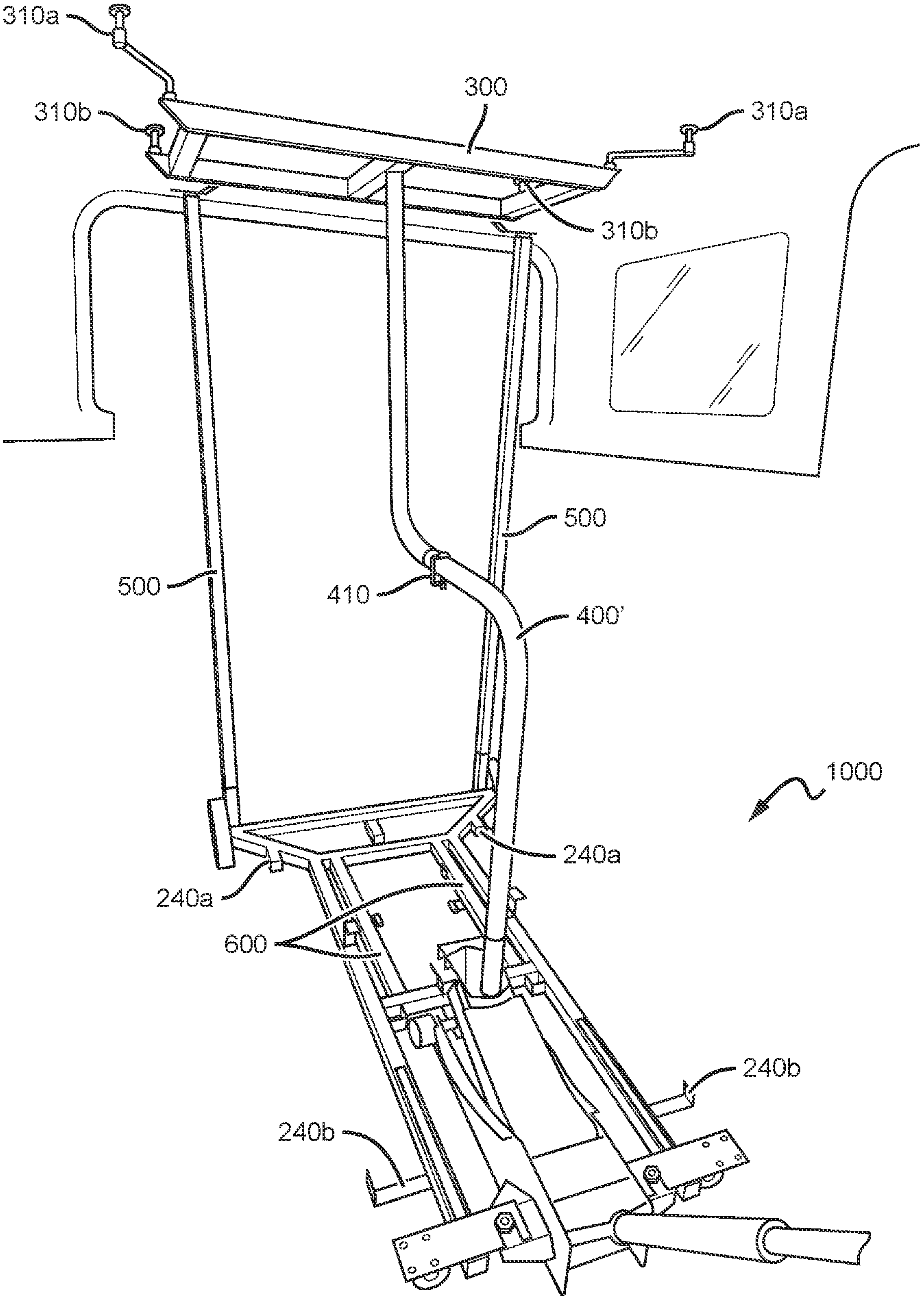
FIG. 21 is a top, back, right-side perspective view of the modular system for removing, storing, and installing removable components from convertible automobiles according to the embodiment of the present disclosure as shown in FIG. 12 with the vertical support structure, horizontal support component, and two support rods in "deployed" positions and supporting a removed hardtop.

FIGS. 20-22 best show the support rods 300 in their deployed position. The support rods 500 shown in FIGS. 20-22 attach to the wheeled base 200 in their deployed position by inserting a narrowed end 501 of the support rod 500 into a sleeve 240*c* on the wheeled base 200. Doing so causes the support rods 500 to be attached upright or at 90 degrees relative to the wheeled base 200. The deployed support rods 500 shown in FIGS. 20-22 are located near the front end 202*a* of the wheeled base 200. It is understood that the deployed support rods 500 may be located in other parts of the wheeled base.

In addition to the top, the doors to convertible vehicles are often times removable. Thus, in other embodiments, the modular device 100 further comprises a plurality of storage rods 600 that are removably attachable to the wheeled base 200 in a "deployed" position and a "stored" position. The storage rods 600 in the embodiment shown in FIGS. 7 and 8 are square rods but it is understood that different shaped rods may be used.

Figure 8:
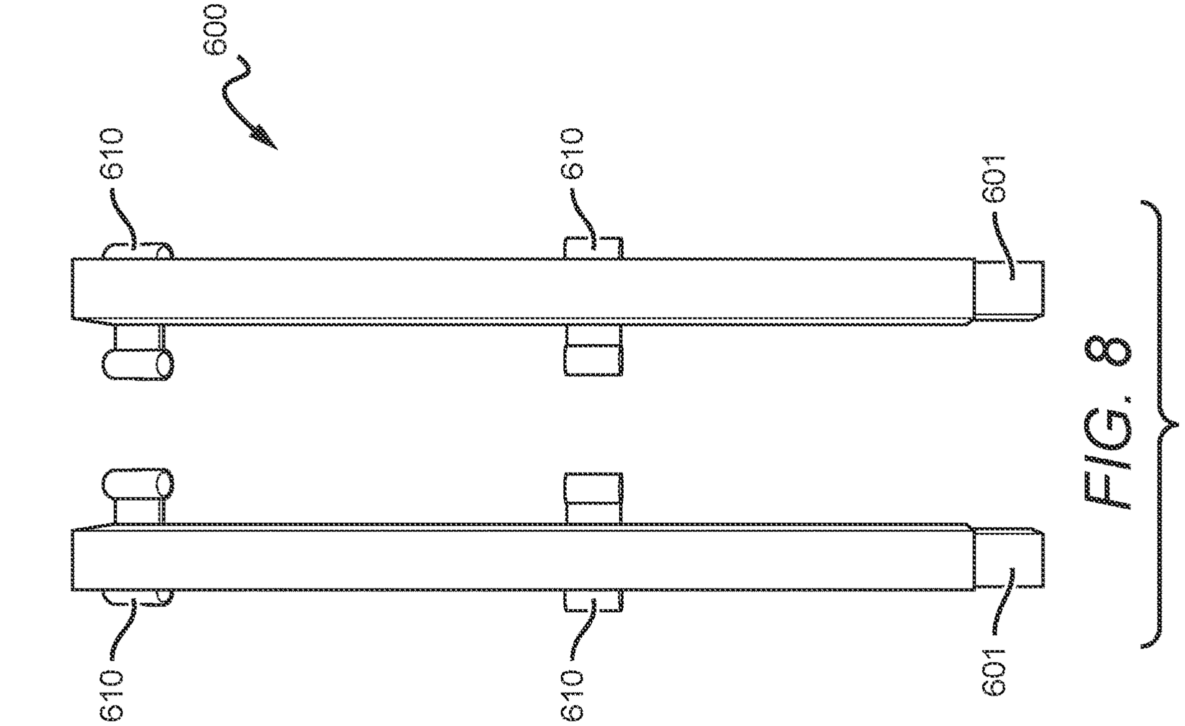
FIG. 8 is a back view of the two storage rods according to the embodiment of the present disclosure as shown in FIG. 7.
Figure 7:
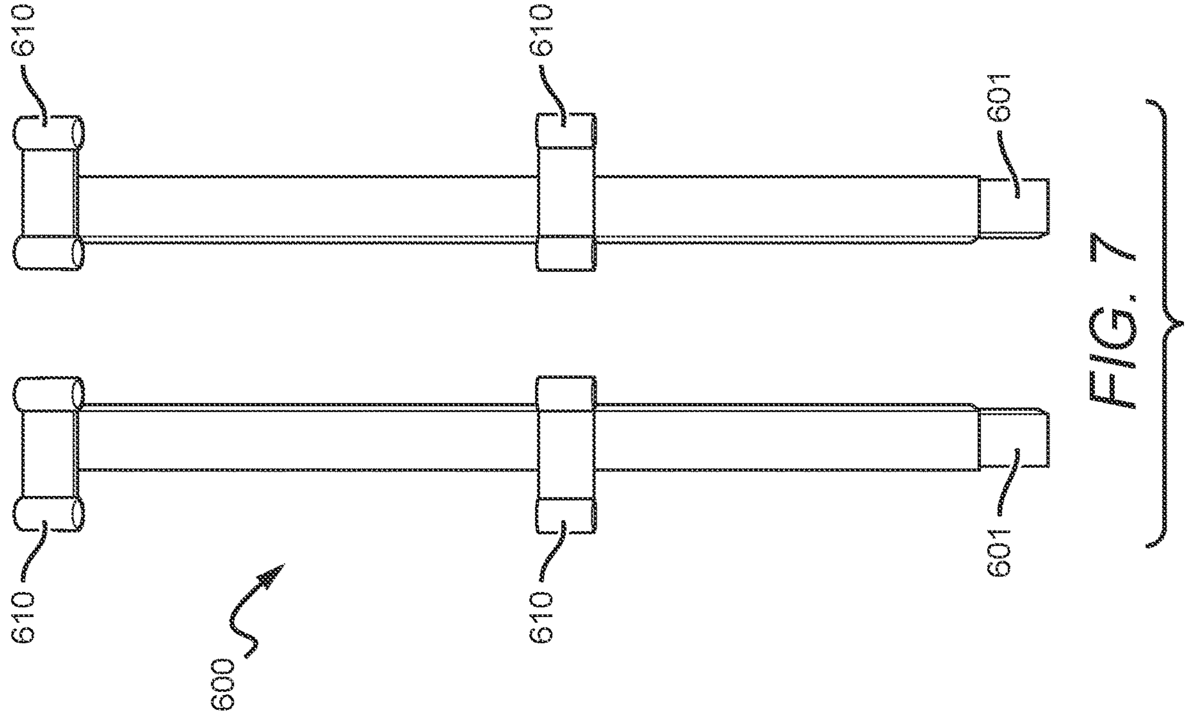
FIG. 7 is a front view of two storage rods of a modular device for removing, storing, and installing removable components from convertible automobiles according to one embodiment of the present disclosure.

In a preferred embodiment, as shown in FIGS. 7 and 8, the storage rods 600 also comprise a narrowed portion 601 on one end that is configured to fit into slots 230*b* in the wheeled base 200 to be placed into their deployed position. When inserted into the slots 230*b* in the wheeled base 200, the storage rods 600 are upright or at a 90 degree angle relative to the wheeled base 200.

Moreover, as shown in FIGS. 7, 8, 22, and 23, the storage rods 600 may comprise hollowed components 610 configured to fit the hinge portions of the removed doors. The hinges may then be inserted and thus hung from and stored on deployed storage rods 600. FIG. 24 best shows the storage rods 600 deployed with removable doors connected thereto utilizing the hollowed components 610. This is feature is expanded upon below.

To store the storage rods 600, the wheeled base 200 may be configured with an additional attachment mechanism. In the preferred embodiment, the wheeled base 200 has a plurality of brackets 230*a* configured to fit and store the storage rods 600. When stored, the storage rods 600 are co-planar and level with the wheeled base 200, as shown in FIGS. 12, 13, 14, 15, and 17.

As shown in FIGS. 17-21, one embodiment of a system for removing, storing, and installing removable components from convertible automobiles comprises a (1) mechanical lifting device and (2) a modular device for removing, storing, and installing removable components from convertible automobiles. The various components and parts of embodiments of a modular device 100 are disclosed and discussed above. It is understood that many different types of mechanical lifting devices may be used in the system 1000, such as a hydraulic floor jack.

Figure 12:
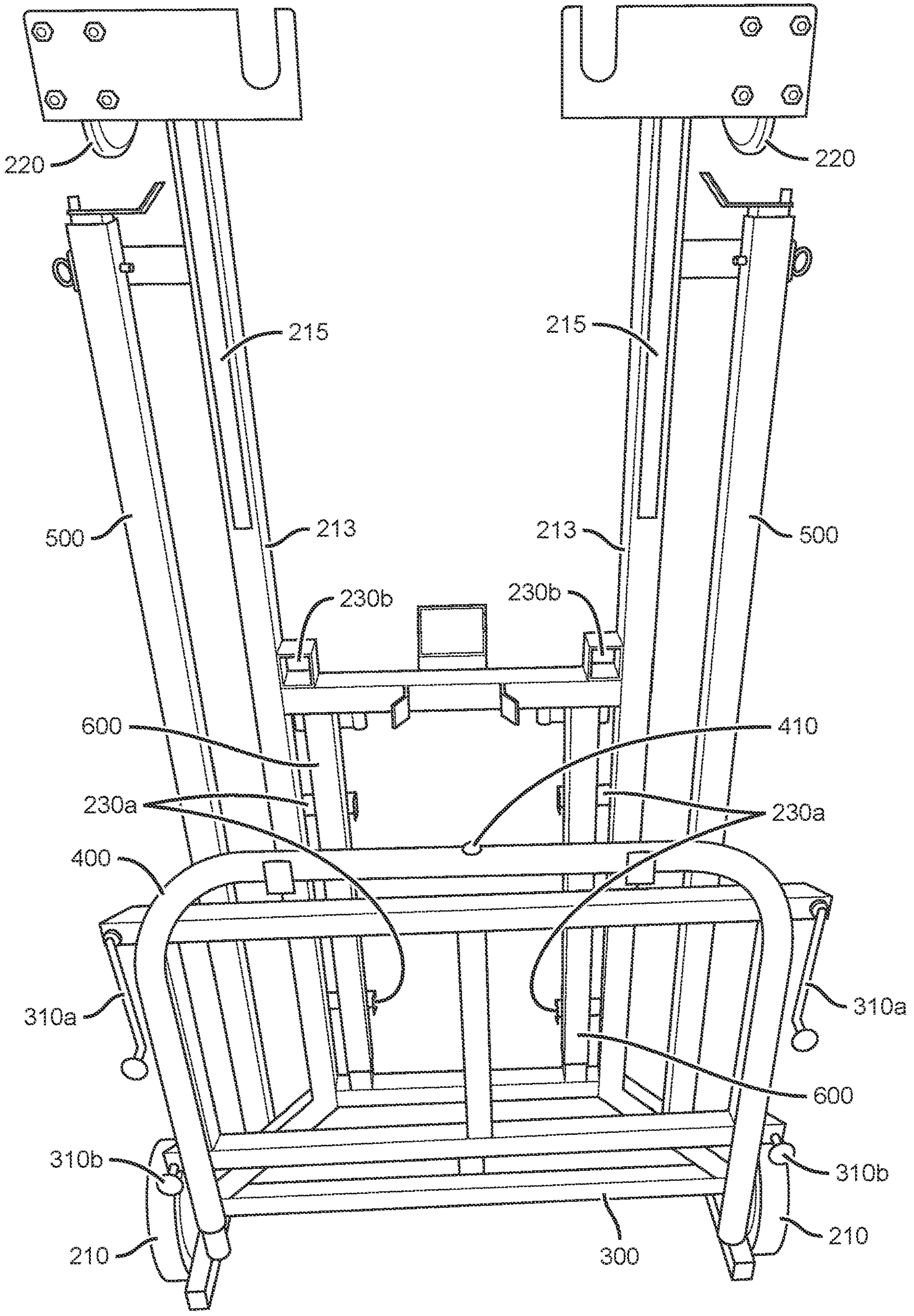
FIG. 12 is a top perspective view of a modular device for removing, storing, and installing removable components from convertible automobiles according to one embodiment of the present disclosure.
Figure 13:
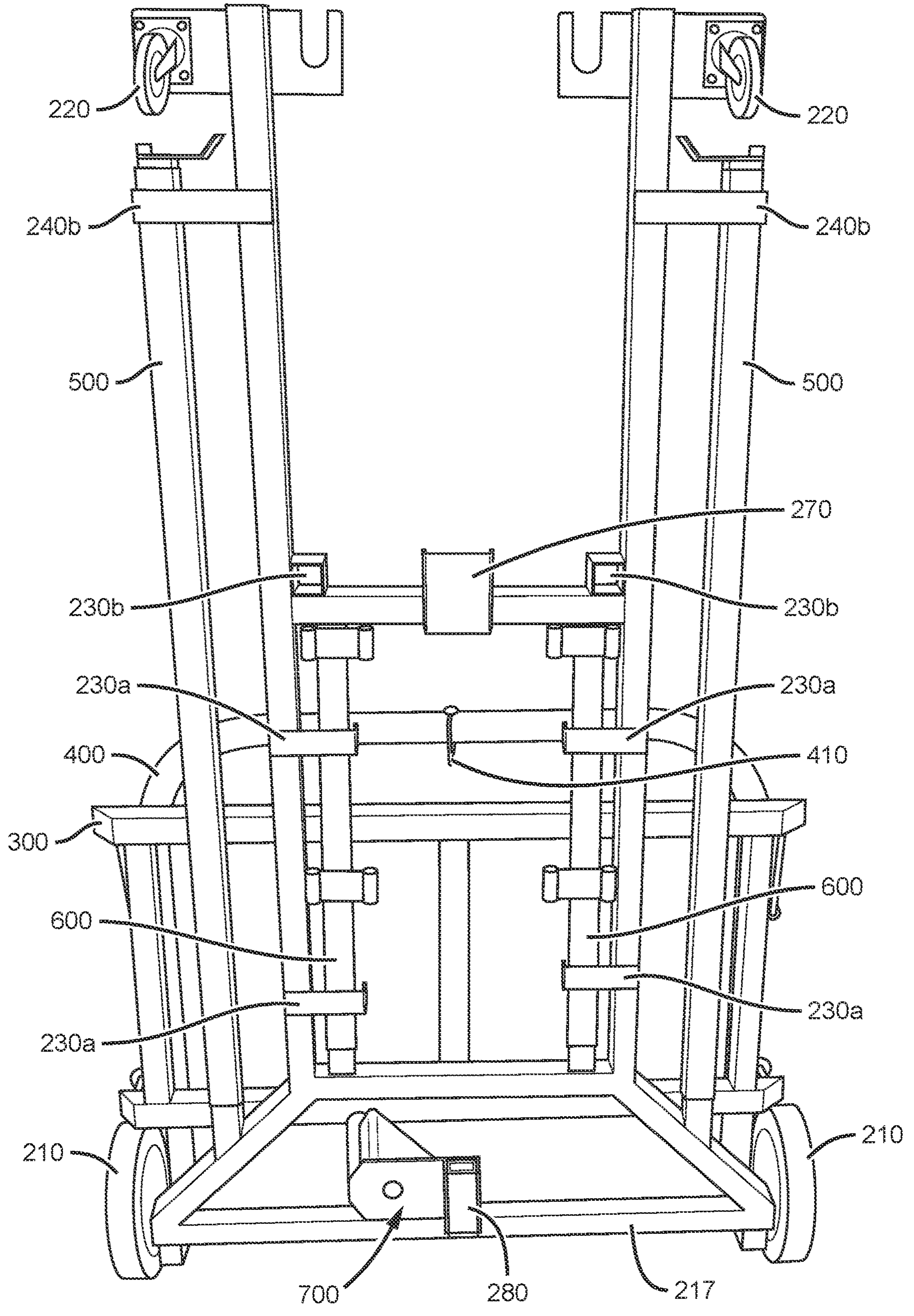
FIG. 13 is a bottom view of a modular device for removing, storing, and installing removable components from convertible automobiles according to the embodiment of the present disclosure as shown in FIG. 12.
Figure 14:
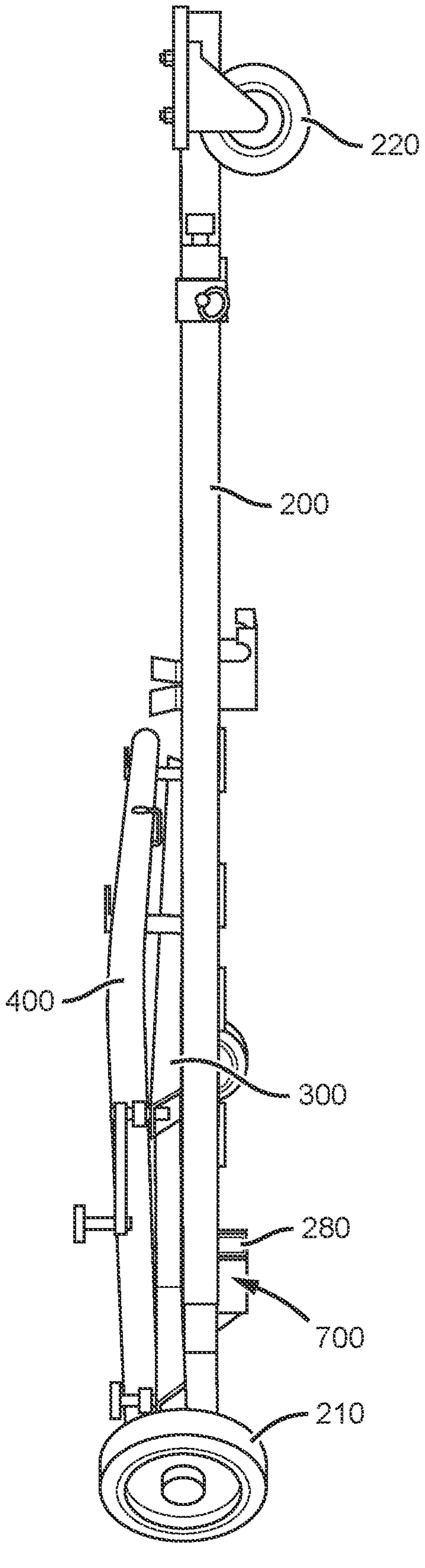
FIG. 14 is a right side view of a modular device for removing, storing, and installing removable components from convertible automobiles according to the embodiment of the present disclosure as shown in FIG. 12.

When the system 1000 is not in use (i.e., removing a top or to storing a top and/or doors), the modular device 100 may be conveniently stored and stood up on its two front wheels 210. The modular device 100 is configured to be able to stand upright on its two front wheels 210 without any further support as shown in FIGS. 12-14.

Figure 16:
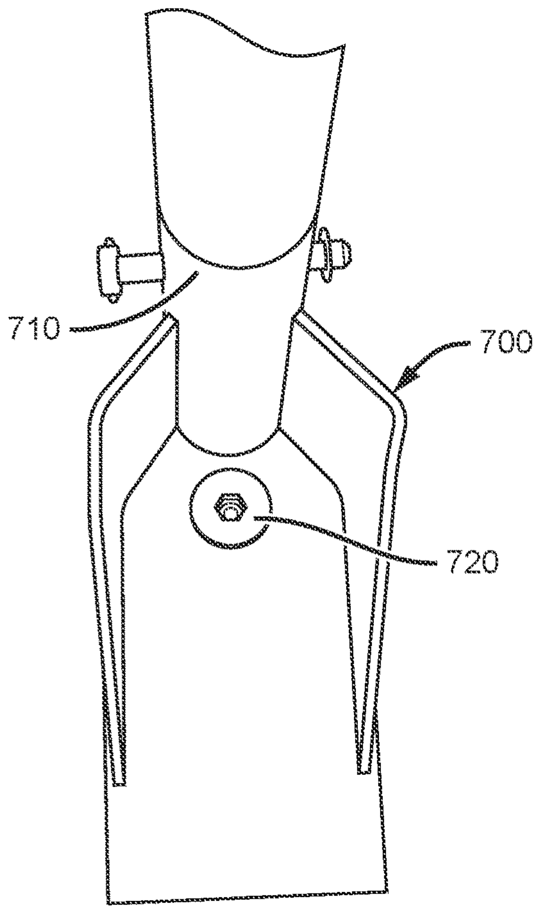
FIG. 16 is a top view of a connector plate of a modular device for removing, storing, and installing removable components from convertible automobiles according to the embodiment of the present disclosure as shown in FIG. 12.
Figure 15:
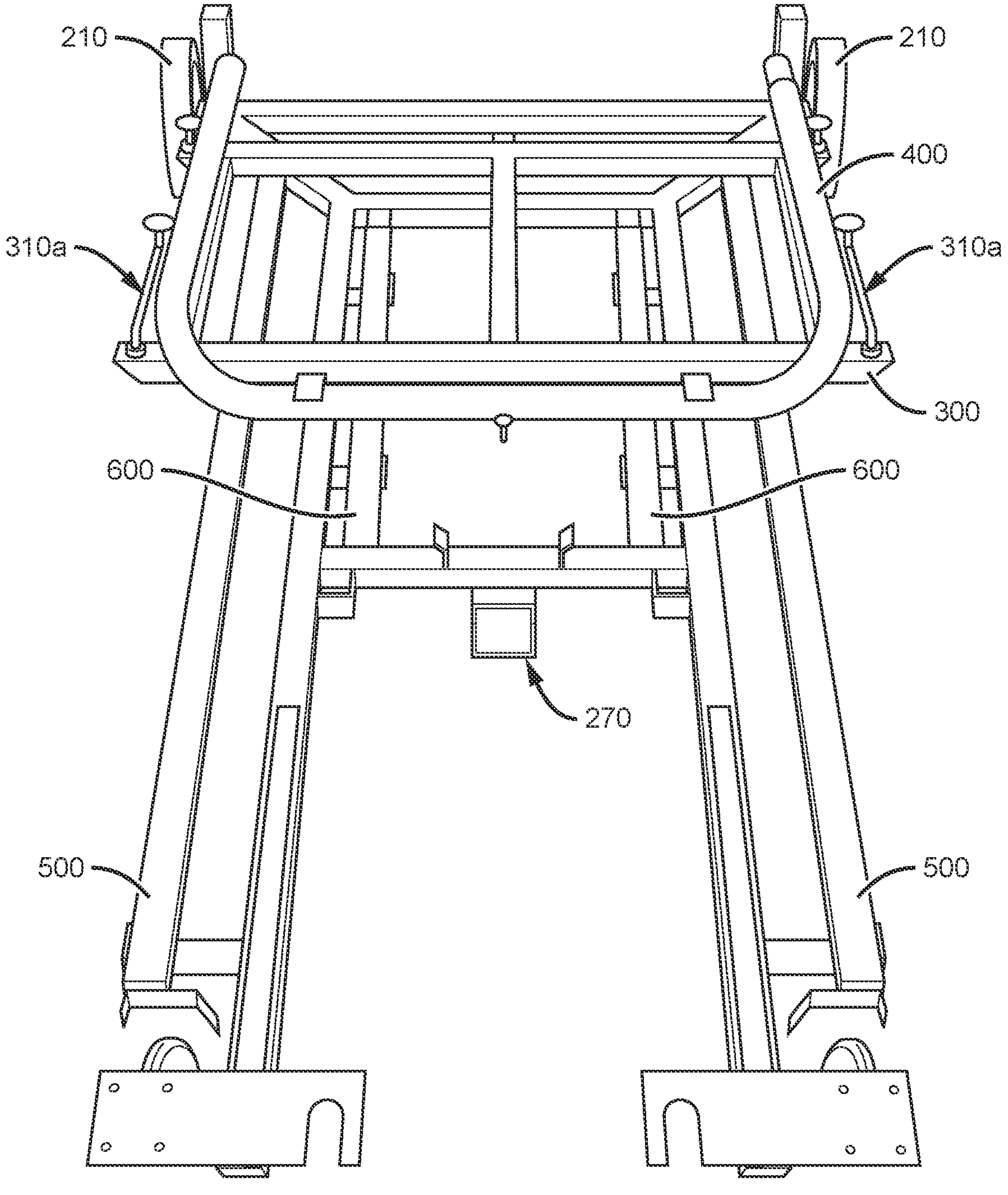
FIG. 15 is a top, back perspective view of a modular device for removing, storing, and installing removable components from convertible automobiles according to the embodiment of the present disclosure as shown in FIG. 12.
Figure 17:
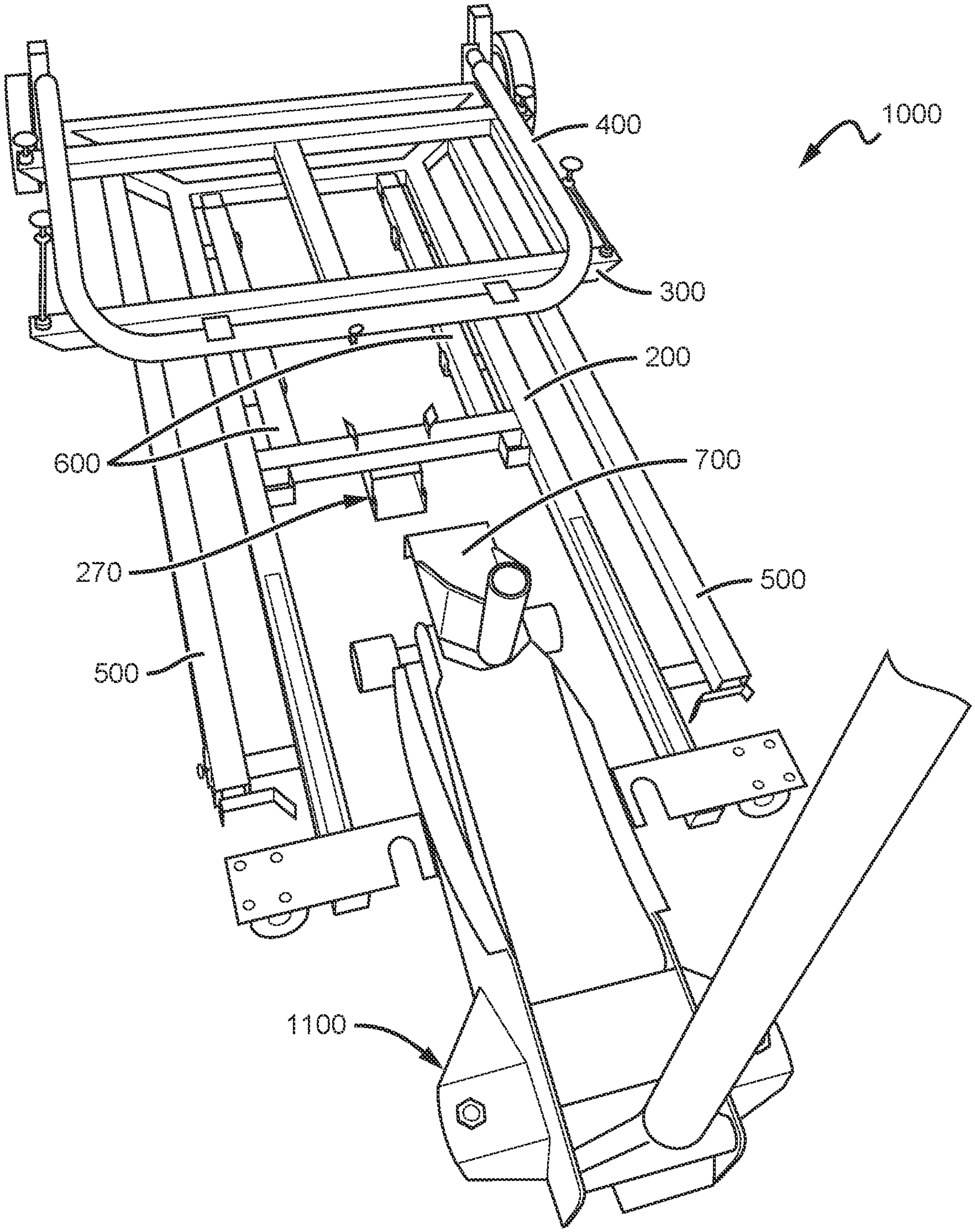
FIG. 17 is a top, back, right-side perspective view of modular system for removing, storing, and a installing removable components from convertible automobiles according to one embodiment of the present disclosure.
Figure 18:
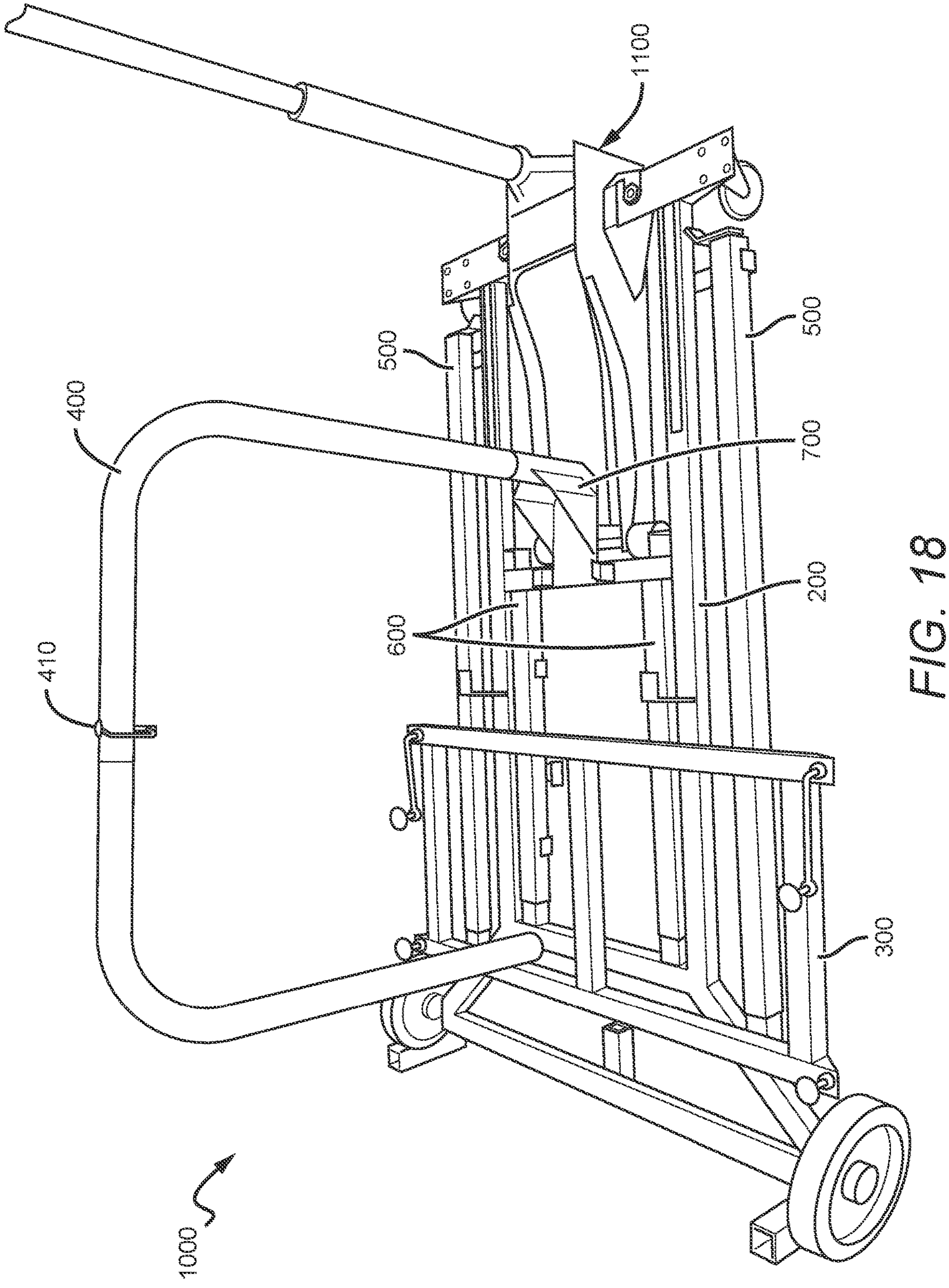
FIG. 18 is a top, right-side perspective view of the modular system for removing, storing, and installing removable components from convertible automobiles according to the embodiment of the present disclosure as shown in FIG. 17.

To use the system 1000 to remove a top from a convertible vehicle, the wheeled base 200 is first situated with all four wheels 210, 220 touching the ground (e.g., FIG. 15). The connector plate 700 is attached to the mechanical lifting device, and both are connected to the wheeled base 200 via the adapter 270 (see FIGS. 16-18). The vertical support structure 400 is then taken off of the wheeled base 200 from its stored position and configuration and its narrowed portion 402 is inserted into the connector plate's 700 sleeve 710 and the vertical support structure's pin lock 420 locks them together (see FIGS. 18 and 19).

Figure 19:
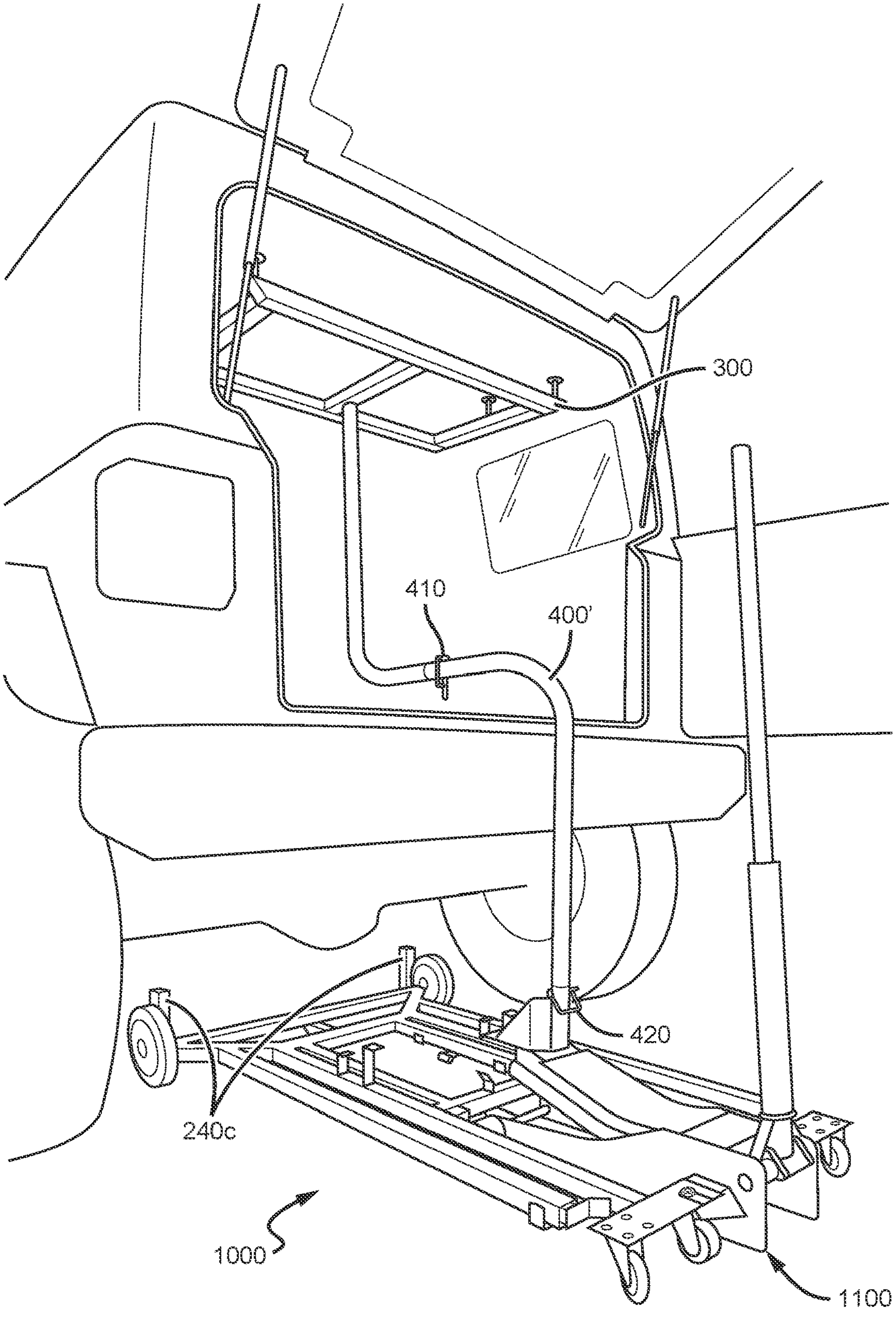
FIG. 19 is a front, right-side perspective view of the modular system for removing, storing, and installing removable components from convertible automobiles according to the embodiment of the present disclosure as shown in FIG. 17 with the vertical support structure and horizontal support component in "deployed" positions.

As depicted in FIG. 19, the pin lock 410 connecting the two pieces 400*a*, 400*b* of the vertical support structure 400, and the vertical support structure is converted into its deployed configuration 400', and locked into place via the pin lock 410. The horizontal support component 300 is taken off of the wheeled base 200 from its stored position and connected to the vertical support structure 400' at its remaining free end. At this point, the system 1000 is ready to be pushed towards the vehicle. The wheeled base 200 is situated partially under the vehicle such that the horizontal support component 300 is placed directly under the removable top. The mechanical lifting device is then utilized to elevate the vertical support structure 400 and the horizontal support component 300 until the horizontal support component 300, and its support plates 310*a*, 310*b*, has lifted the top off of the vehicle and is completely supporting it. When this is completed, the system 1000 may be wheeled away from the vehicle.

Once the system 1000 has been wheeled away from the vehicle a safe distance away, the mechanical lifting device can be lowered, in turn lowering the connector plate 700, vertical support structure 400, and horizontal support component 300 back to the wheeled base 200. The connector plate 700 (and the vertical support structure 400, the horizontal support component 300, and the top) can be connected to the adapter 270 of the wheeled base 200 and the mechanical lifting device can be removed.

As noted above, some embodiments of the modular device 100 and, thus, the system 1000, comprise support rods 500 and storage rods 600. Once the top has been removed from the vehicle, the support rods 500 may be placed in their deployed positions 240*c* on the wheeled base 200. The extension pieces 510 of the support rods 500 may be adjusted to ensure that the support rods 500 are supporting some of the weight of the removed top.

If the vehicle has removable doors and the user wishes to remove them in addition to the top, the storage rods 600 may be placed in their deployed positions 230*b* on the wheeled base 200. The two front doors can be removed and their hinges hung in the hollowed components 610 of the storage rods 600 as shown in FIGS. 24-25.

Figure 25:
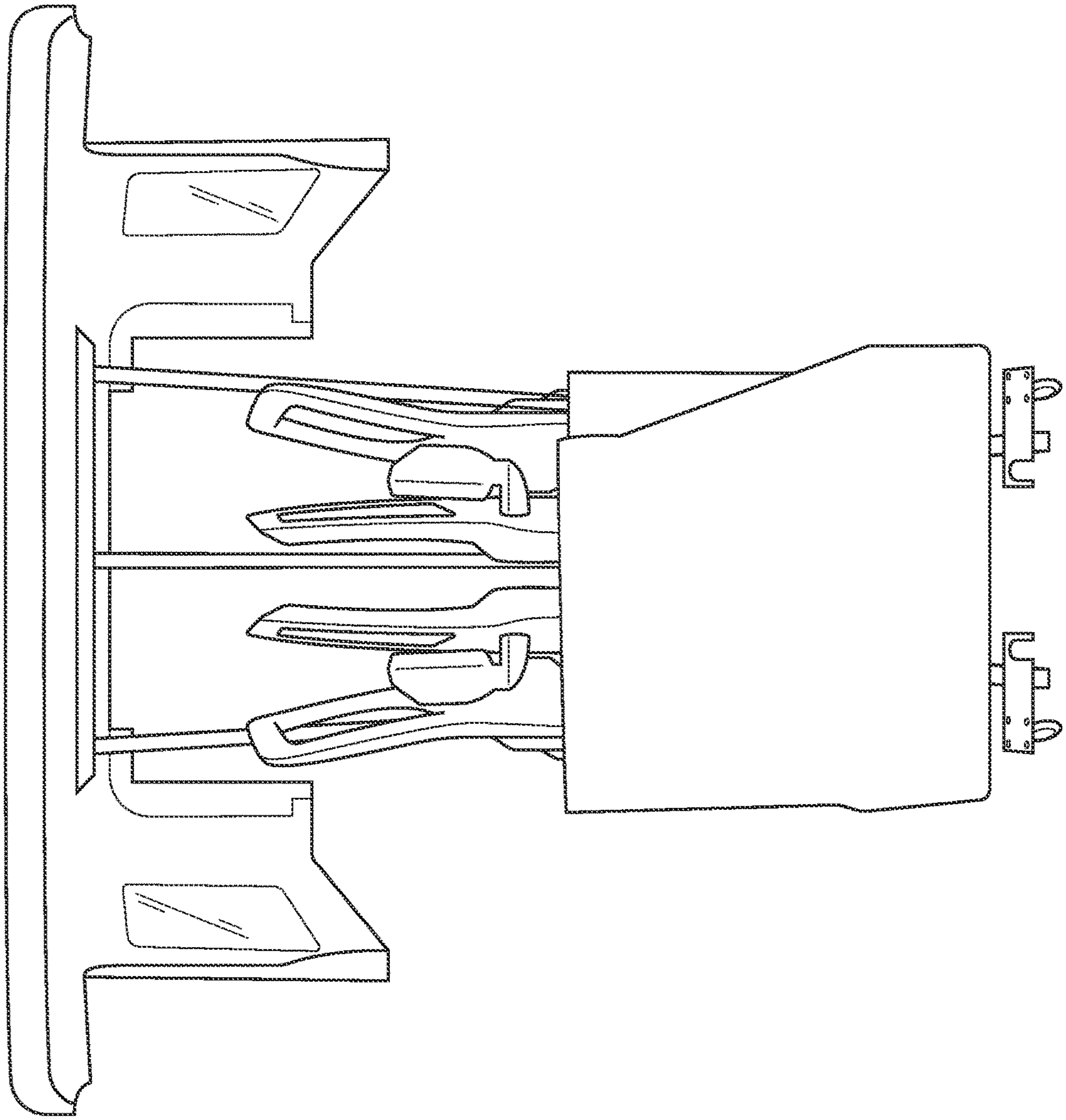
FIGS. 25-29 are various views of the modular device for removing, storing, and installing removable components from convertible automobiles according to the embodiment of the present disclosure as shown in FIG. 12 with the vertical support structure, horizontal support component, two support rods, and two storage rods in "deployed" positions holding a hardtop and six removable doors from a convertible vehicle.
Figure 26:
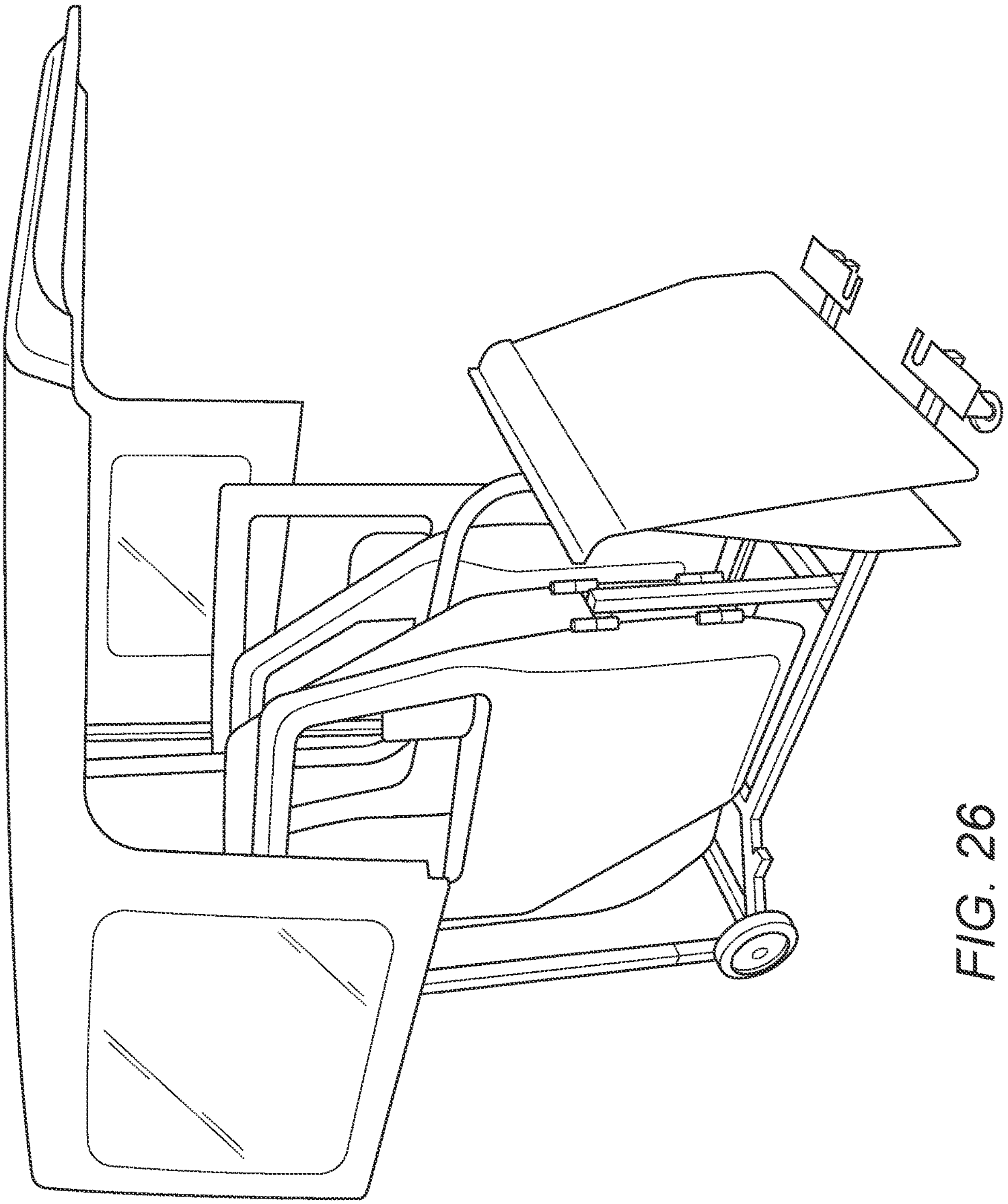
Figure 27:
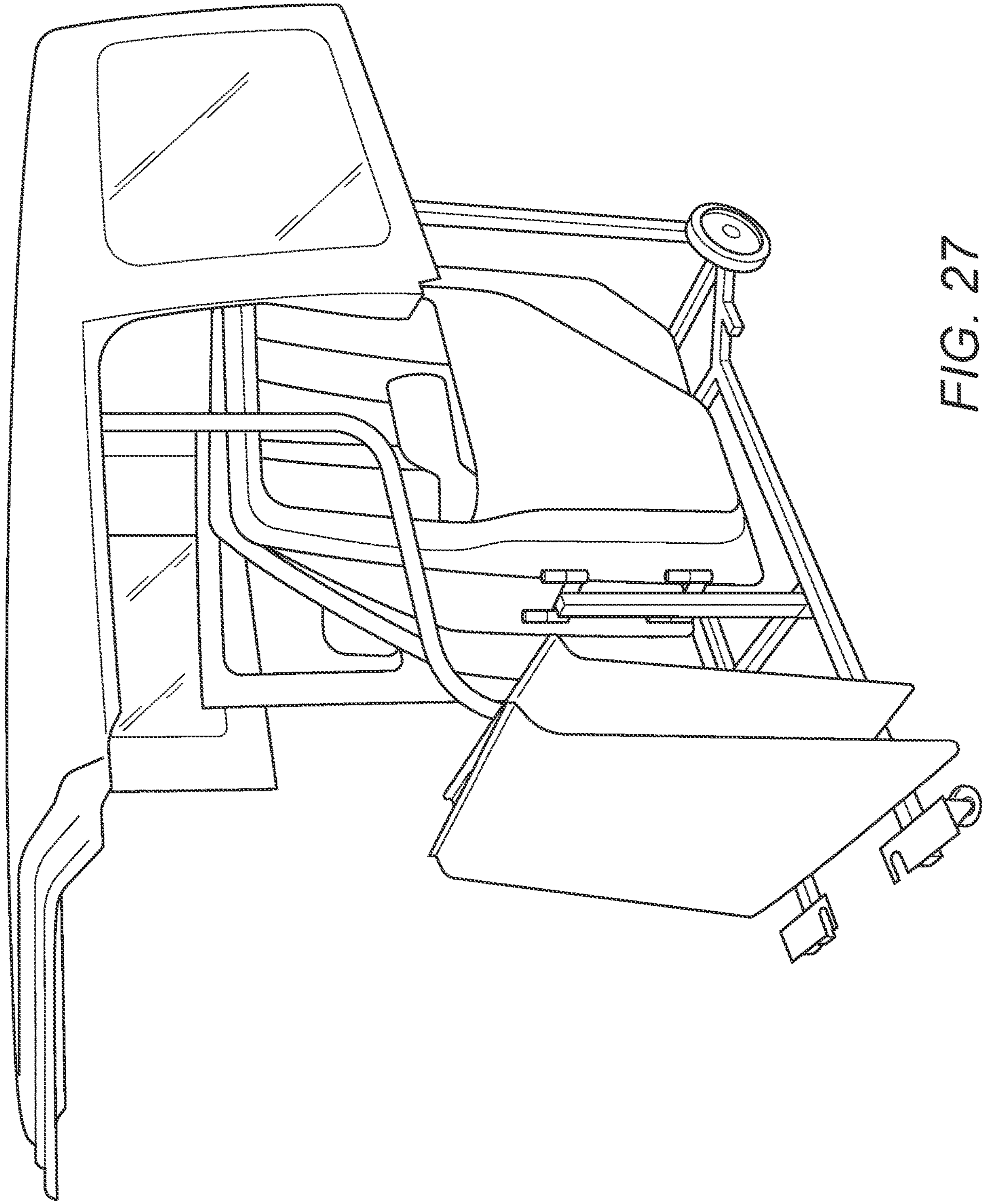
Figure 28:
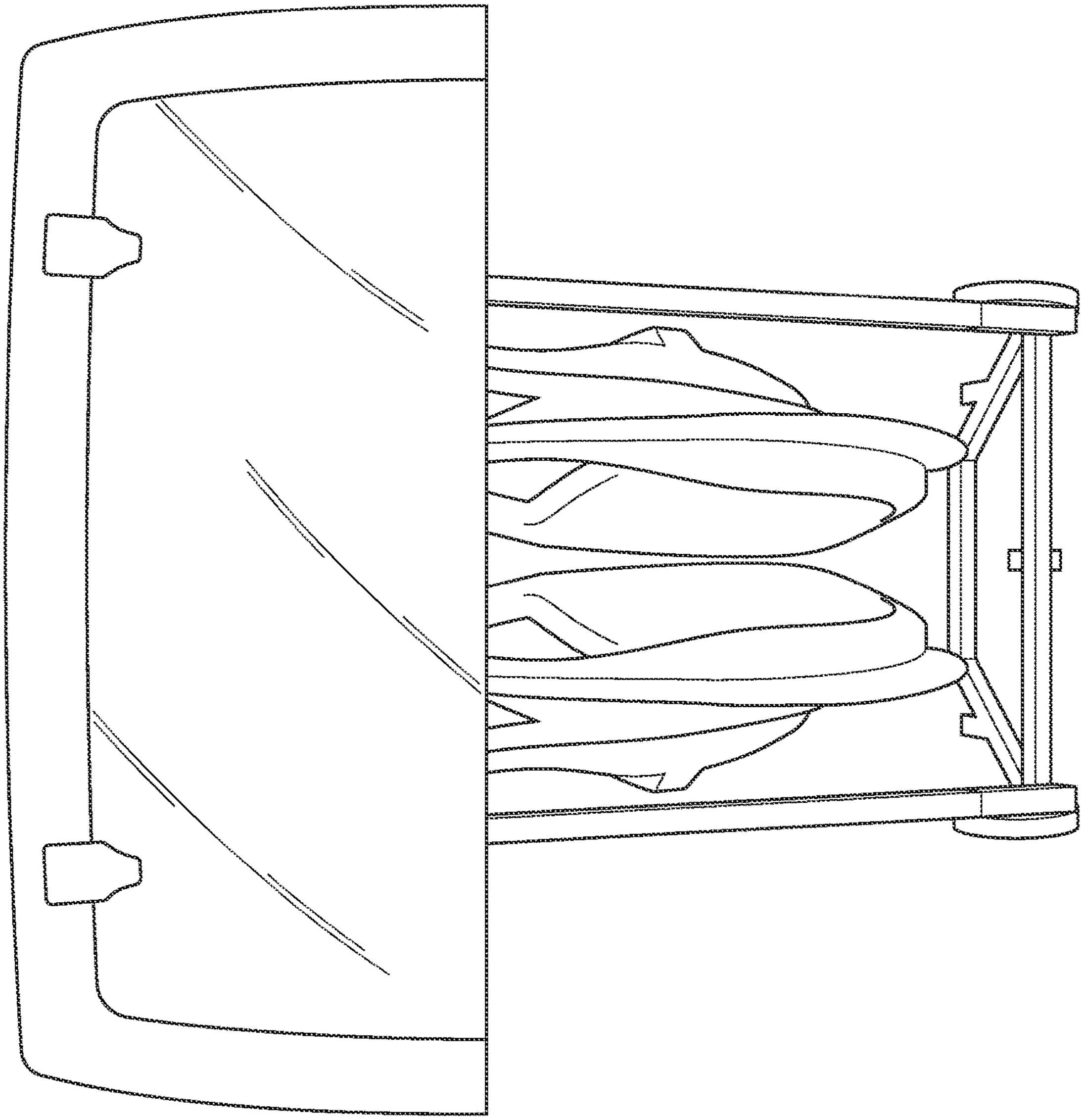
Figure 29:
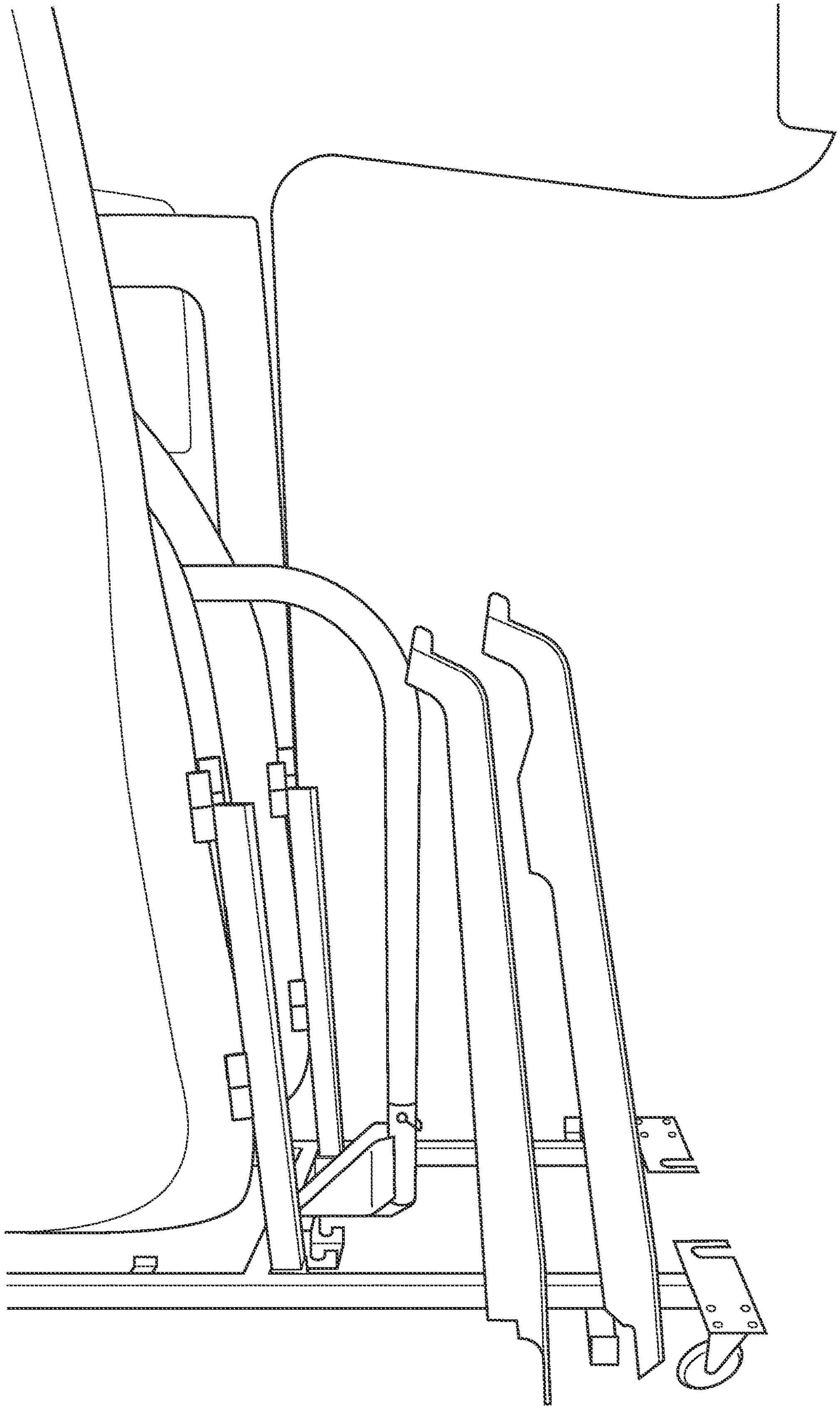

Finally, the back two doors of the vehicle can be placed and stored on the rubber portion 215 of the wheeled base 200 as shown in FIGS. 25-27.

The particular embodiments of the modular device 100 (and its various components) disclosed above and shown in FIGS. 1-29 are made of steel, but it is understood that the device 100 and its various components may be made of many other durable materials such as aluminum or titanium. The components of the modular device 100 may comprise the same material or may be comprised of different materials.

Although the present disclosure has been described in detail with reference to certain configurations thereof, other versions are possible. Embodiments of the present disclosure can comprise any combination of compatible features shown in the various figures, and these embodiments should not be limited to those expressly illustrated and discussed. Therefore, the spirit and scope of the disclosure should not be limited to the versions described above.

The foregoing is intended to cover all modifications and alternative constructions falling within the spirit and scope of the disclosure as expressed in the claims, wherein no portion of the disclosure is intended, expressly or implicitly, to be dedicated to the public domain if not set forth in any claims.

I claim:

1. A modular device for removing, storing, and installing removable components from convertible automobiles comprising:

- a wheeled base comprising:
  - two front wheels at a front end of said wheeled base;
  - two back wheels at a back end of said wheeled base; and
  - a frame that connects said front wheels to one another, and each of said two front wheels to one of said back wheels;
- a vertical support structure configured to removably attach to said wheeled base in a deployed position and a stored position;
- a horizontal support component configured to removably attach to said vertical support structure in a deployed position and to said wheeled base in a stored position; and
- a plurality of storage rods configured to removably attach to said wheeled base in a deployed position and a stored position, wherein each storage rod of said plurality of storage rods comprises a plurality of openings configured to receive hinges of removable doors from said convertible automobiles;
- wherein said wheeled base is configured to connect to a mechanical lifting device.

2. The device of claim 1, wherein said modular device may be stored in an upright position on said front wheels.

3. The device of claim 1, wherein said modular device comprises steel.

4. The device of claim 1, further comprising a connector plate configured to removably attach to said wheeled base in a deployed position and a stored position.

5. The device of claim 4, wherein said connector plate, when in said deployed position, is configured to connect said device to said mechanical lifting device and said vertical support structure.

6. The device of claim 4, wherein said wheeled base comprises a plurality of attachment mechanisms configured to allow said vertical support structure, said horizontal support component, and said connector plate to removably attach to said wheeled base in said stored positions.

7. The device of claim 1, wherein said wheeled base comprises a plurality of attachment mechanisms configured to allow said vertical support structure and said connector plate to removably attach to said wheeled base in said stored positions.

8. The device of claim 7, wherein said attachment mechanisms are brackets.

9. The device of claim 1 further comprising a plurality of support rods configured to removably attach to said wheeled base in a deployed position and a stored position.

10. The device of claim 9, wherein said plurality of support rods comprise extension pieces configured to adjust the length of said support rods.

11. The device of claim 9, wherein said plurality of support rods are co-planar with said wheeled base when in their stored position.

12. The device of claim 9 comprising two support rods.

13. The device of claim 1, wherein said plurality of storage rods are co-planar with said wheeled base when in their stored position.

14. The device of claim 1 comprising two storage rods.

15. The device of claim 1, wherein said horizontal support component comprises a plurality of support plates.

16. The device of claim 15, wherein said horizontal support component has four support plates.

17. The device of claim 15, wherein at least two of said plurality of support plates are adjustable within their plane parallel to said horizontal support component.

18. A system for removing, storing, and installing removable components from convertible automobiles comprising:

- a mechanical lifting device; and
- a modular device for removing, storing, and installing removable components from said convertible automobiles comprising:
- a wheeled base comprising:
  - two front wheels at a front end of said wheeled base;
  - two back wheels at a back end of said wheeled base; and
  - a frame that connects said front wheels to one another, and each of said two front wheels to one of said back wheels, wherein said front and back wheels are on the same side of said frame;

a vertical support structure configured to removably attach to said wheeled base in a deployed position and a stored position;

a horizontal support component configured to removably attach to said vertical support structure in a deployed position and to said wheeled base in a stored position; and a connector plate; and a plurality of storage rods configured to removably attach to said wheeled base in a deployed position and a stored position, wherein each storage rod of said plurality of storage rods comprises a plurality of openings configured to receive hinges of removable doors from said convertible automobiles;

wherein said wheeled base is configured to connect to mechanical lifting device via said connector plate.

* * * * *